(12) United States Patent
Serna Merino et al.

(10) Patent No.: US 10,703,986 B1
(45) Date of Patent: Jul. 7, 2020

(54) SELECTIVE OXIDATION USING ENCAPSULATED CATALYTIC METAL

(71) Applicant: ExxonMobil Research and Engineering Company, Annandale, NJ (US)

(72) Inventors: Pedro Serna Merino, Branchburg, NJ (US); Jadeene E. Gabay, Coral Springs, FL (US); Avelino Corma Canos, Valencia (ES); Manuel Moliner Marin, Valencia (ES)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 40 days.

(21) Appl. No.: 16/261,748

(22) Filed: Jan. 30, 2019

(51) Int. Cl.
| | | |
|---|---|---|
| *C10G 11/05* | (2006.01) | |
| *B01J 29/70* | (2006.01) | |
| *C01B 32/40* | (2017.01) | |
| *C01B 32/50* | (2017.01) | |

(52) U.S. Cl.
CPC .......... *C10G 11/05* (2013.01); *B01J 29/7015* (2013.01); *C01B 32/40* (2017.08); *C01B 32/50* (2017.08); *B01J 2229/64* (2013.01); *B01J 2523/82* (2013.01); *C10G 2300/107* (2013.01); *C10G 2300/1048* (2013.01); *C10G 2300/4093* (2013.01); *C10G 2300/701* (2013.01)

(58) Field of Classification Search
None
See application file for complete search history.

(56) References Cited

U.S. PATENT DOCUMENTS

| | | |
|---|---|---|
| 4,072,600 A | 2/1978 | Schwartz |
| 4,093,535 A | 6/1978 | Schwartz |
| 4,199,435 A | 4/1980 | Chessmore et al. |
| 4,235,704 A | 11/1980 | Luckenbach |
| 4,247,416 A | 1/1981 | Doherty et al. |
| 4,299,686 A | 11/1981 | Kuehl |
| 4,300,997 A | 11/1981 | Meguerian et al. |
| 4,313,848 A | 2/1982 | Scott |

(Continued)

FOREIGN PATENT DOCUMENTS

| | | |
|---|---|---|
| EP | 2269733 A | 1/2011 |
| JP | 2015044720 A | 3/2013 |

(Continued)

OTHER PUBLICATIONS

Altwasser et al., "Ruthenium-containing small-pore zeolites for shape-selective catalysis", Microporous and Mesoporous Materials, 104, 2007, 281-288.

(Continued)

*Primary Examiner* — Derek N Mueller
(74) *Attorney, Agent, or Firm* — Hsin Lin

(57) ABSTRACT

Systems and methods are provided for selective oxidation of CO and/or $C_{3-}$ hydrocarbonaceous compounds in a reaction environment including hydrocarbons and/or hydrocarbonaceous components. The selective oxidation can be performed by exposing the CO and/or $C_{3-}$ hydrocarbonaceous compounds to a catalytic metal that is encapsulated in a small pore zeolite. The small pore zeolite containing the encapsulated metal can have a sufficiently small pore size to reduce or minimize the types of hydrocarbons or hydrocarbonaceous compounds that can interact with the encapsulated metal.

21 Claims, 5 Drawing Sheets

(56) References Cited

U.S. PATENT DOCUMENTS

| | | |
|---|---|---|
| 4,325,833 A | 4/1982 | Scott |
| 4,413,573 A | 11/1983 | Hall et al. |
| 4,434,147 A | 2/1984 | Dimpfl et al. |
| 4,521,389 A | 6/1985 | Blanton et al. |
| 4,585,747 A | 4/1986 | Valyocsik |
| 4,640,829 A | 2/1987 | Rubin |
| 4,698,218 A | 10/1987 | Belot et al. |
| 4,828,680 A | 5/1989 | Green et al. |
| 4,985,133 A | 1/1991 | Sapre |
| 4,988,432 A | 1/1991 | Chin |
| 4,991,521 A | 2/1991 | Green et al. |
| 5,002,654 A | 3/1991 | Chin |
| 5,015,362 A | 5/1991 | Chin |
| 5,021,144 A | 6/1991 | Altrichter |
| 5,372,706 A | 12/1994 | Buchanan et al. |
| 5,455,020 A | 10/1995 | Vaughan et al. |
| 5,529,964 A | 6/1996 | Weitkamp et al. |
| 6,049,018 A | 4/2000 | Calabro et al. |
| 2015/0118121 A1 | 4/2015 | Chen et al. |
| 2015/0166913 A1 | 6/2015 | Brody et al. |
| 2015/0167587 A1 | 6/2015 | Weiss et al. |
| 2015/0167588 A1 | 6/2015 | Beutel et al. |
| 2015/0218007 A1 | 8/2015 | Chen et al. |
| 2016/0023913 A1 | 1/2016 | Goel et al. |

FOREIGN PATENT DOCUMENTS

| | | |
|---|---|---|
| WO | 2010/043891 A | 4/2010 |
| WO | 2014/090698 A | 6/2014 |
| WO | 2017202495 A1 | 11/2017 |

OTHER PUBLICATIONS

Chen et al., "Contribution of hydrogen spillover to the dehydrogenation of naphthalene over diluted Pt/RHO catalysts", Applied Catalysis A: General, 358, 2009, 103-109.

Choi et al., "Mercaptosilane-assisted synthesis of metal clusters within zeolites and catalytic consequences of encapsulation", J. Am. Chem. Soc., 132, 2010, 9129-9137.

Creyghton et al., "Synthesis of Pt clusters in zeolite BEA effect of reduction rate on cluster size and location", J. Chem. Soc. Faraday Trans., 92, 1996, 4637-4642.

Garcia et al., "Nickel amine complexes as structure-directing agents for aluminophosphate molecular sieves: a new route to supported nickel catalysts", Topics in Catalysis, 24, 2003, 115-124.

Goel et al., "Synthesis and catalytic properties of metal clusters encapsulated within small-pore (SOD, GIS, ANA) zeolites", J. Am. Chem. Soc., 134, 2012, 17688-17695.

Guczi et al., "Zeolite supported mono- and bimetallic systems: structure and performance as CO hydrogenation catalysts", Applied Catalysis A: General, 186, 1999, 375-394.

Im et al., "Maximizing the catalytic function of hydrogen spillover in platinum-eccansulated aluminosilicates with controlled nanostructures", Nature Communications, 5:3370, 2014, 1-8.

Kang, "Methanol conversion on metal-incorporated SAPO-34s (MeSAPO-34s)", J. Mol. Catalysis A: Chemical, 160, 2000, 437-444.

Lee et al., "Revisiting hydrogen spillover in Pt/LTA: Effects of physical diluents having different acid site distributions", J. of Catalysis, 325, 2015, 26-34.

Martin et al., "High yield synthesis of high-silica chabazite by combining the role of zeolite precursors and tetraethylammonium: SCR of NOx", Chem. Commun., 51, 2015, 9965-9968.

Ren et al., "Design and synthesis of a catalytically active Cu-SSZ-13 zeolite from a copper-amine complex template", Chinese J. of Catalysis, 33, 2012, 92-105.

Ryoo et al., "Appplication of the Xenon-adsorption method for the study of metal cluster formation and growth on Y zeolite", J. Am. Chem. Soc., 114, 1992, 76-82.

Yang et al., "Shape selective and hydrogen spillover approach in the design of sulfur-tolerant hydrogenation catalysts", J. of Catalysis, 243, 2006, 36-42.

Yang et al., "Incorporating platinum precursors into a NaA-zeolite synthesis mixture promoting the formation of nanosized zeolite" Microporous and Mesoporous Materials, 117, 2009, 33-40.

Wu et al., "Hydrothermal synthesis of LTA-encapsulated metal clusters and consequences for catalyst stability, reactivity, and selectivity", J. of Catalysis, 311, 2014, 458-468.

Zhan et al., "RuO2 clusters within LTA zeolite cages: consequences of encapsulation on catalytic reactivity and selectivity", Angew. Chem. Int. Ed., 46, 2007, 3697-3700.

Baerlocher et al., "Atlas of zeolite framework types", Elsevier, Sixth Revised Edition, 2007.

Stevenson et al., "Modeling of NOx emissions from the laboratory regeneration of spent fluid catalytic cracking catalyst", Ind. Eng. Chem. Res., 44, 2005, 2966-2974.

Shi et al., "Nitrogen Chemistry and Coke Transformation of FCC Coked Catalyst during the Regeneration Process", Scientific Reports, 6, 2016, 27309:1-10.

Moliner et al., "Reversible transformation of Pt nanoparticles into single atoms inside high-silica chabazite zeolite", J. Am. Chem. Soc., 138, 2016, 15743-15750.

Lyon, "The NH3—NO—O2 Reaction", International Journal of Chemical Kinetics, 3, 1976, 315-318.

US 10,703,986 B1

SELECTIVE OXIDATION USING ENCAPSULATED CATALYTIC METAL

FIELD

Systems and methods are provided for selective oxidation of CO and $C_{3-}$ hydrocarbons in the presence of hydrocarbonaceous compounds using catalytic metal that is encapsulated in a zeolitic structure having a largest pore channel based on an 8-member ring size.

BACKGROUND OF THE INVENTION

Carbon monoxide (CO) is a common contaminant of refinery streams that can cause a variety of problems. Such problems can include deactivation of metal catalysts by poisoning and/or facilitating sintering on the catalyst, as well as safety and environmental concerns. In many instances, conventional removal of CO from refinery streams is accomplished by oxidation of the CO to form $CO_2$, such as by exposing the CO to a catalyst including a noble metal supported on an amorphous oxide support. However, such catalysts are not selective for CO oxidation. As a result, unwanted side reactions can also occur that can result in loss of product yield and/or production of unwanted side products.

An example of an unwanted side reaction is the formation of $NO_x$ in the flue gas of a regenerator for a fluid catalytic cracking (FCC) system. CO is generated during the regeneration of FCC catalysts due to incomplete combustion of coke. To avoid emission of this CO to the atmosphere, the CO can be exposed to a noble metal catalyst to form $CO_2$. Unfortunately, organic nitrogen-containing compounds are also present in the coke for an FCC catalyst. Such organic nitrogen-containing compounds are also oxidized by the noble metal catalyst, resulting in production of $NO_x$. This $NO_x$ can potentially correspond to 90% of the $NO_x$ generated within a refinery. Such NOx can be converted to $N_2$ via selective catalytic reduction, but performing this conversion requires addition of additional processing equipment to the regenerator flue stack and incurs substantial additional cost.

What is needed are improved systems and methods for removal of CO from refinery streams while reducing or minimizing additional equipment and/or costs for such removal. Additionally or alternately, what is needed are improved systems and methods for selective removal of $C_{3-}$ hydrocarbonaceous compounds, including alkanes, alkenes, alkynes, and/or alcohols, when such small hydrocarbonaceous compounds are present as impurities within a stream containing heavier hydrocarbonaceous compounds. In all of these scenarios, elimination of the smaller molecule(s) that may pose a problem while reducing or minimizing loss of desirable larger compounds is of interest.

U.S. Pat. Nos. 4,072,600 and 4,093,535 teach use of combustion-promoting metals such as Pt, Pd, Ir, Rh, Os, Ru and Re in cracking catalysts in concentrations of 0.01 to 50 ppm, based on total catalyst inventory. This type of approach can reduce or minimize CO concentration in regenerator flue gas, but can also result in production of substantial amounts of $NO_x$.

U.S. Pat. No. 4,991,521 describes a regenerator where coke on spent FCC catalyst can be used to reduce NOx emissions from an FCC regenerator. The patent shows a two stage FCC regenerator, wherein flue gas from a second stage of regeneration contacts coked catalyst. Although effective at reducing NOx emissions, this approach cannot be used in most existing regenerators.

PCT Publication WO/2017/202495 describes synthetic zeolites comprising a catalytic metal, where the catalytic metal is (at least partially) encapsulated in a small pore zeolite structure.

SUMMARY OF THE INVENTION

In one aspect, a method for selective oxidation of CO and $C_{3-}$ hydrocarbonaceous compounds is provided. The method can include exposing a feed comprising a) CO, $C_{3-}$ hydrocarbonaceous compounds, or a combination thereof, and b) at least one additional hydrocarbon, hydrocarbonaceous compound, or combination thereof, to an oxidizing environment in the presence of a small pore zeolite-encapsulated metal catalyst to oxidize at least a portion of the CO, $C_{3-}$ hydrocarbons, or a combination thereof. The small pore zeolite-encapsulated metal catalyst can include 0.01 wt % to 10 wt % of Ru, Rh, Pd, Os, Ir, Pt, Ni, Au, Ag, or combination thereof as a catalytic metal. In some aspects, at least 20 wt % of the catalytic metal can be encapsulated in the zeolite.

In another aspect, a system for performing fluid catalytic cracking is provided. The system can include a fluid catalytic cracking reactor, the fluid catalytic cracking reactor including a riser and a stripper. The stripper can include a stripper catalyst outlet and a cracked product outlet. The riser can include a riser catalyst inlet. The system can further include a regenerator including a regenerator catalyst inlet, a regenerator catalyst outlet, an oxidizing gas inlet, and a flue gas outlet, the stripper catalyst outlet being in fluid communication with the regenerator catalyst inlet, the regenerator catalyst outlet being in fluid communication with the riser catalyst inlet. The system can further include a catalyst mixture within at least one of the fluid catalytic cracking reactor and the regenerator, the catalyst mixture comprising a cracking catalyst and 0.001 wt % to 1.0 wt % of a small pore zeolite-encapsulated metal catalyst, the small pore zeolite-encapsulated metal catalyst comprising 0.01 wt % to 10 wt % of Ru, Rh, Pd, Os, Ir, Pt, Ni, Ag, Au, or a combination thereof as an encapsulated metal.

DETAILED DESCRIPTION OF THE INVENTION

Figure 1:
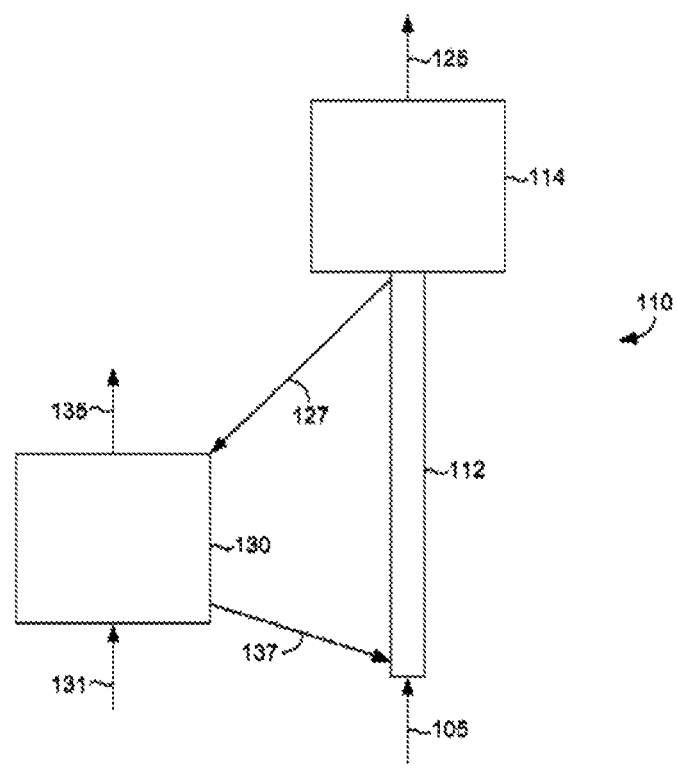
FIG. 1 shows an example of a reaction system for performing fluid catalytic cracking of a feed using a catalyst mixture that includes an encapsulated metal catalyst for CO conversion.

In various aspects, systems and methods are provided for selective oxidation of CO in a reaction environment including hydrocarbons and/or hydrocarbonaceous components. The selective oxidation can be performed by exposing the CO to a catalytic metal that is encapsulated in a small pore zeolite. The small pore zeolite containing the encapsulated metal can have a sufficiently small pore size to reduce or minimize the types of hydrocarbons or hydrocarbonaceous compounds that can interact with the encapsulated metal. As a result, CO can be oxidized in the presence of the encapsulated metal. However, branched hydrocarbonaceous compounds and hydrocarbonaceous compounds including ring structures (such as aromatic rings) can be too large to fit into the pores. More generally, $C_{4+}$ compounds and/or hydrocarbonaceous compounds that include atoms other than carbon and hydrogen can be large compared to the effective pore size of the small pore zeolite, resulting in reduced or minimized catalysis of reactions involving the $C_{4+}$ compounds. The exact reduction in catalysis for linear aliphatic hydrocarbons or hydrocarbonaceous compounds can be dependent on the individual compound.

More generally, in addition to CO, small linear hydrocarbonaceous compounds such as methane, methanol, ethane, ethene, ethyne, ethanol, propane, propene, propyne, and 1-propanol can be selectively oxidized. Such small linear hydrocarbonaceous compounds can be referred to as $C_{3-}$ hydrocarbonaceous compounds. In some aspects, the small pore zeolite-encapsulated metal catalyst can be used for oxidation of CO, $C_{3-}$ hydrocarbonaceous compounds, or a combination thereof. In some aspects, the small pore zeolite-encapsulated metal catalyst can be used for oxidation of CO, $C_{3-}$ hydrocarbons, or a combination thereof. In some aspects, the small pore zeolite-encapsulated metal catalyst can be used for oxidation of CO, $C_{2-}$ hydrocarbonaceous compounds, or a combination thereof. In some aspects, the small pore zeolite-encapsulated metal catalyst can be used for oxidation of CO, $C_{2-}$ hydrocarbons, or a combination thereof.

In some aspects, the systems and methods for selective oxidation of CO (and/or $C_{3-}$ hydrocarbonaceous compounds) can correspond to systems and methods for selective oxidation of CO in a catalyst regenerator, such as a catalyst regenerator associated with an FCC reactor. During regeneration of FCC catalyst, both CO and cyclic nitrogen-containing compounds (i.e., nitrogen-containing ring compounds) can generated and/or vaporized from the FCC catalyst. A conventional oxidation catalyst for oxidation of CO can typically also cause oxidation of the nitrogen-containing compounds, resulting in production of NOx. By contrast, it is believed that the cyclic nitrogen-containing compounds can be too large to interact with the metal catalyst that is encapsulated by the small pore zeolite. As a result, CO can be substantially converted to $CO_2$ while reducing or minimizing formation of NOx.

The oxidizing metal encapsulated in the small pore zeolite can correspond to any convenient metal that is conventionally suitable for oxidation of CO to $CO_2$, or more generally suitable for oxidation of CO and/or $C_{3-}$ hydrocarbonaceous compounds. Suitable metals can include Group 8-10 metals (according to the IUPAC periodic table) such as Ni, Rh, Pt, Pd, or the other noble metals. Optionally but preferably, the small pore zeolite used for encapsulating the metal can correspond to a zeolite with a low content of Al in the framework structure.

In addition to providing selective oxidation, it has been unexpectedly discovered that use of an oxidizing metal that is encapsulated in zeolite can also provide improved activity over time. For conventional oxidation catalysts, the catalyst can deactivate after one or more exposures to the reaction environment within a regenerator. By contrast, a catalyst corresponding to an oxidizing metal encapsulated in a small pore zeolite can substantially maintain activity after exposure to the regenerator environment.

In a reaction environment such as an FCC reaction environment, where catalyst is circulated between at least a reactor and a regenerator, the benefit of the encapsulated metal catalyst can be achieved by including 0.001 wt % to 10 wt %, or 0.01 wt % to 10 wt % of the encapsulated metal catalyst relative to the total catalyst loading. In some aspects where the encapsulated metal corresponds to Pt, the amount of encapsulated catalyst included in the total catalyst loading can be sufficient to provide a Pt concentration of 1 wppm to 1000 wppm relative to the total catalyst loading.

The encapsulated metal catalyst can be beneficial for reducing or minimizing the CO concentration in a reaction environment. The reaction environment can correspond to a reactor, a regenerator, or another type of environment where CO is introduced and/or generated. The encapsulated metal catalyst can be effective for conversion of CO to $CO_2$ in an oxidizing environment at CO concentrations of 20 vol % or less, or 10 vol % or less, or 5.0 vol % or less, or 1.0 vol % or less, or 0.1 vol % or less. The amount of encapsulated metal catalyst to achieve a desired conversion level can vary, such as depending on the CO concentration. The amount of conversion can correspond to 50 wt % or more of CO, or 90 wt % or more, or 99 wt % or more. Additionally or alternately, the encapsulated metal catalyst can be effective for conversion of $C_{3-}$ hydrocarbonaceous compounds in an oxidizing environment. The encapsulated metal catalyst can be effective for conversion of $C_{3-}$ hydrocarbonaceous compounds at concentrations of 5.0 vol % or less, or 1.0 vol % or less, or 0.1 vol % or less. The amount of conversion can correspond to 50 wt % or more, or 90 wt % or more of the small hydrocarbonaceous compounds, or 99 wt % or more.

While performing CO conversion and/or $C_{3-}$ hydrocarbonaceous compound conversion in a first (oxidizing) environment, the encapsulated catalyst can also cause a reduced, minimized, or negligible amount of conversion of one or more other components, such as $C_{4+}$ hydrocarbonaceous compounds including branches or ring structures. The reduced or minimized conversion of the one or more other components can correspond to reduced or minimized conversion in the first (oxidizing) environment, or in an associated environment. For example, the encapsulated catalyst can be effective for conversion of CO in a regenerator, while causing a reduced or minimized amount of conversion of nitrogen-containing hydrocarbonaceous ring structures in the regenerator. Optionally, the encapsulated catalyst can also cause reduced or minimized conversion of hydrocarbon aromatics in a second associated oxidizing environment. The reduced or minimized conversion can correspond to 30 vol % or less conversion of the hydrocarbon aromatics and/or hydrocarbonaceous aromatics, or 10 vol % or less or 5.0 vol % or less, or 1.0 vol % or less. In aspects where nitrogen-containing hydrocarbonaceous compound(s) are present, such as cyclic nitrogen-containing compounds, the amount of the nitrogen-containing hydrocarbonaceous compound(s) can be 0.01 vol % to 10 vol %, or 0.01 vol % to 1.0 vol %, or 0.1 vol % to 10 vol %.

Figure 2:
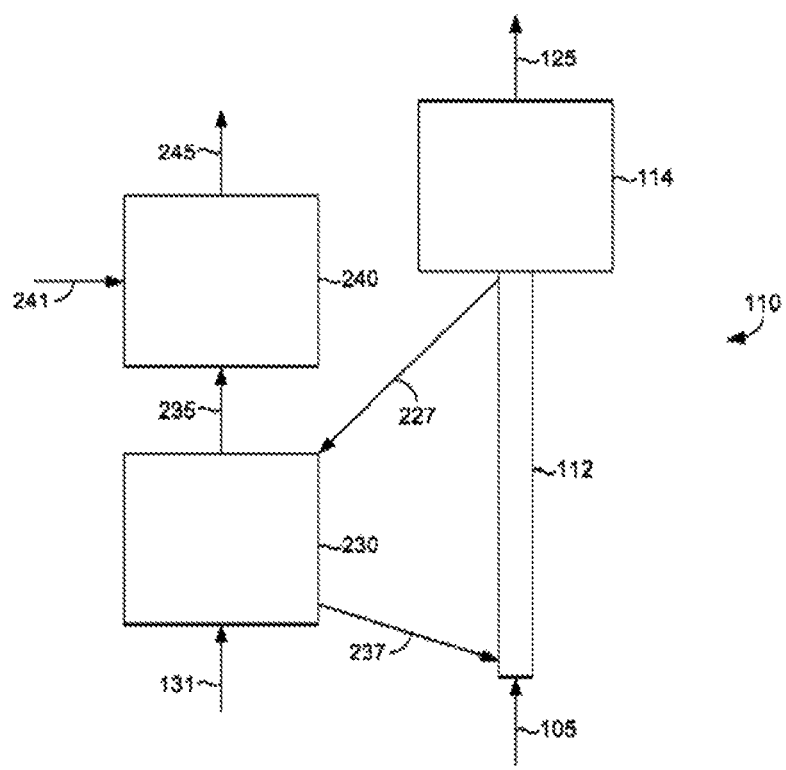
FIG. 2 shows an example of a reaction system for performing fluid catalytic cracking of a feed that includes a selective catalytic reduction stage for conversion of NOx in the flue gas generated by the regenerator.

The reaction system configurations in FIG. 1 and FIG. 2 illustrate an example of the potential benefits of using a small pore zeolite-encapsulated metal catalyst for CO oxidation in an FCC reaction system. FIG. 1 shows an example of a configuration that is suitable for use when a small pore zeolite-encapsulated metal catalyst is included in the catalyst inventory. In FIG. 1, a feedstock 105 is introduced into the riser 112 of an FCC reactor 110. Regenerated catalyst stream 137 is also introduced into the riser, along with any optional fresh and/or make-up catalyst that is desired (not shown). The feedstock and catalyst pass up through the riser 112 during the fluid catalytic cracking process. The feedstock and catalyst eventually reach stripper 114 of reactor 110, where gas phase products 125 are separated from spent catalyst 127. The spent catalyst is then passed into regenerator 130 for regeneration of the catalyst in the presence of air 131 or another source of oxygen. This produces regenerated catalyst 137 and a flue gas 135. By using a small pore zeolite encapsulated metal catalyst, the CO produced during catalyst regeneration can be converted to $CO_2$ prior to exiting from the regenerator 130 as part of flue gas 135. Additionally, oxidation of nitrogen from nitrogen-containing hydrocarbonaceous compounds produced and/or separated from the catalyst during regeneration can be substantially avoided, thus reducing or minimizing production of NOx in the regenerator 130.

FIG. 2 illustrates potential differences for an FCC reaction system when a conventional oxidation catalyst is used, rather than a small pore zeolite encapsulated metal catalyst. In FIG. 2, feedstock 105 is introduced into riser 112, but the regenerated catalyst stream 237 now included a conventional oxidation catalyst, such as Pt supported on $Al_2O_3$ or another oxide support. After performing the fluid catalytic cracking reaction, stripper 114 separates the gas phase products 125 from spent catalyst 227. The spent catalyst 227 is then passed into regenerator 230. Due to the presence of the conventional oxidation catalyst in the configuration shown in FIG. 2, flue gas 235 can include a substantial amount of NOx, which needs to be converted prior to exhausting gas to the atmosphere. This can be accomplished, for example, by exposing the flue gas 235 to a selective catalytic reduction catalyst in selective catalytic reduction unit 240. Ammonia 241 is also passed into selective catalytic reduction unit 240 in order to generate a selectively reduced flue gas 245 where NOx has been substantially converted to $N_2$.

Definitions

The term "aromatic hydrocarbons" refers to molecules containing one or more aromatic rings. Examples of aromatic hydrocarbons are benzene, toluene, xylenes, naphthalene, and methylnaphthalenes. "Nitrogen-containing aromatics" refer to molecules containing one or more aromatic rings that also contain at least one nitrogen atom, such as pyridine. "Sulfur-containing aromatics" refer to molecules containing one or more aromatic rings that also contain at least one sulfur atom, such as thiophene. "Oxygen-containing aromatics" refer to molecules containing one or more aromatic rings that also contain at least one oxygen atom, such as furan.

The term "aromatic" refers to unsaturated hydrocarbon or hydrocarbonaceous compounds with at least one closed ring of at least 5 atoms, with all of the ring atoms being co-planar or almost co-planar and covalently linked, and with all of the ring atoms being part of a mesomeric system.

The term "hydrocarbon" refers to an organic compound that includes the elements hydrogen and carbon. Hydrocarbonaceous compounds are defined herein as organic compounds that may also include other elements, such as, but not limited to, halogens, metallic elements, nitrogen, oxygen, and/or sulfur. Hydrocarbons and hydrocarbonaceous compounds generally fall into two classes: aliphatic, or straight chain compounds, and cyclic, or closed ring compounds, including cyclic terpenes. Examples of hydrocarbon-containing materials include any form of natural gas, oil, coal, and bitumen.

The term "$C_n$" hydrocarbon or hydrocarbonaceous compound refers to a hydrocarbon or hydrocarbonaceous compound with "n" carbon atoms. Compounds having a range of carbon atoms can be referred to using a notation such as "$C_n$-$C_m$ hydrocarbons" or "$C_n$-$C_m$ hydrocarbonaceous compounds", which represents hydrocarbons/hydrocarbonaceous compounds having between "n" and "m" carbon atoms. Such hydrocarbons or hydrocarbonaceous compounds can be further specified as cyclic compounds, branched compounds, or linear compounds.

The term "catalyst" refers to a material, which under certain conditions of temperature or pressure increases the rate of specific chemical reactions. A catalyst may also be a material that performs as a physisorbent or chemisorbent for specific components of the feed stream.

The term "chain length" may broadly refer to a number of atoms forming and/or making a backbone and/or structure of a molecule and/or compound, such as carbon atoms for a hydrocarbon.

The term "chemical reaction" refers to any process including the breaking or making of chemical bonds including a dissociation, recombination, or rearrangement of atoms.

The term "coke" refers to the solid residue remaining from the pyrolysis of hydrocarbons.

The term "crude oil" refers to hydrocarbons formed primarily of carbon and hydrogen atoms. The hydrocarbons may also include other elements, such as, but not limited to, halogens, metallic elements, nitrogen, oxygen, or sulfur. Hydrocarbons derived from an oil-bearing formation may include, but are not limited to, kerogen, bitumen, pyrobitumen, asphaltenes, resins, oils, or combinations thereof.

The term "fixed-bed reactor" refers to a reactor containing catalyst material typically in pellet form, packed in a static bed. Such fixed-bed reactors can correspond to any convenient type of fixed-bed reactor, such as a radial flow reactor and/or an axial flow reactor.

The term "higher hydrocarbons" refers to hydrocarbon(s) having more than one carbon atom per molecule, e.g., ethane, ethylene, propane, propylene, benzene, toluene, xylenes, naphthalene, and/or methyl naphthalene. Similarly, "higher hydrocarbonaceous compounds" refer to organic compound(s) including at least one carbon atom and at least one non-hydrogen atom, e.g., methanol, ethanol, methylamine, and/or ethylamine.

The term "synthetic zeolite" should be understood to refer to a zeolite which has been prepared from a synthesis mixture as opposed to being a naturally occurring zeolite which has been obtained by mining or quarrying or similar processes from the natural environment.

The term "small pore size synthetic zeolite" as used herein refers to a synthetic zeolite wherein the pores of the zeolite have a size in the range of from 3.0 Å to less than 5.0 Å. The small pore size synthetic zeolite will generally have an 8-membered ring framework structure but some 9- or 10-membered ring zeolites are known to have distorted rings which have a size in the range of from 3.0 to 5.0 Å and fall within the scope of the term "small pore size synthetic zeolite" as used herein. Optionally, the small pore size synthetic zeolite is an 8-membered ring zeolite. A number of 8-membered ring zeolites are listed in the "Atlas of Zeolite Framework Types", eds, Ch. Baerlocher, L. B. McCusker, D. H. Olson, Elsevier, Sixth Revised Edition, 2007 or in Chem. Rev. 2018, 118, 5265-5329.

Zeolites can be described as rigid three-dimensional framework of $TO_4$ tetrahedra (T=Si, Al, P, Ti, etc.). The tetrahedra are cross-linked by the sharing of oxygen atoms with the electrovalence of the tetrahedra containing trivalent element (e.g., aluminum or boron) or divalent element (e.g., Be or Zn) being balanced by the inclusion in the crystal of a cation, for example, a proton, an alkali metal or an alkaline earth metal cation. This can be expressed wherein the ratio of the Group 13 element (e.g., aluminum or boron) to the number of various cations, such as $H^+$, $Ca^{2+}*2$, $Sr^{2+}*2$, $Na^+$, $K^+$, or $Li^+$, is equal to unity.

Zeolites that find application in catalysis include any of the naturally occurring or synthetic crystalline zeolites. Examples of these zeolites include large pore zeolites, medium pore size zeolites, and small pore zeolites. These zeolites and their isotypes are described in "Atlas of Zeolite Framework Types", eds, Ch. Baerlocher, L. B. McCusker, D. H. Olson, Elsevier, Sixth Revised Edition, 2007, and in the International Zeolite Association website (www. www.iza-online.org), which are hereby incorporated by reference.

Synthesis of zeolites typically involves the preparation of a synthesis mixture which comprises sources of all the elements present in the zeolite, often with a source of hydroxide ion to adjust the pH. In many cases a structure directing agent (SDA) is also present. Structure directing agents are compounds which are believed to promote the formation of zeolite frameworks and which are thought to act as templates around which certain zeolite structures can form and which thereby promote the formation of the desired zeolite. Various compounds have been used as structure directing agents including various types of quaternary ammonium cations.

Example of Reaction System: Fluid Catalytic Cracking

A fluid catalytic cracking (FCC) reaction system is an example of a reaction system that can benefit from use of an encapsulated metal catalyst as part of the catalyst inventory. During conversion of FCC feed in the reactor, the cracking catalyst can accumulate coke. The coked catalyst is passed to a regenerator, where coke is removed. This produces CO, but also typically releases nitrogen-containing compounds, such as cyclic nitrogen-containing compounds. Conventionally, a catalyst for oxidation of CO included in the catalyst inventory can also result in oxidation of the nitrogen from such nitrogen-containing compounds. By contrast, an encapsulated metal catalyst can provide CO oxidation with reduced or minimized production of NOx.

Suitable feedstreams for processing in an FCC reactor can include, but are not limited to, feeds boiling in the range of 430° F. to 1050° F. (~221° C. to ~566° C.), such as gas oils, heavy hydrocarbon oils comprising materials boiling above 1050° F. (~566° C.); heavy and reduced petroleum crude oil; petroleum atmospheric distillation bottoms; petroleum vacuum distillation bottoms; pitch, asphalt, bitumen, other heavy hydrocarbon residues; tar sand oils; shale oil; liquid products derived from coal liquefaction processes; catalytic slurry oils from an FCC process; and mixtures thereof. The FCC feed may comprise recycled hydrocarbons, such as light or heavy cycle oils.

An example of a suitable reactor for performing an FCC process can be a riser reactor. Within the reactor riser, the FCC feedstream can be contacted with a catalytic cracking catalyst under cracking conditions thereby resulting in spent catalyst particles containing carbon deposited thereon and a lower boiling product stream. The cracking conditions can typically include: temperatures from 900° F. to 1060° F. (~482° C. to ~571° C.), or 950° F. to 1040° F. (~510° C. to ~560° C.); hydrocarbon partial pressures from 10 to 50 psia (~70-350 kPa-a), or from 20 to 40 psia (~140-280 kPa-a); and a catalyst to feed (wt/wt) ratio from 3 to 8, or 5 to 6, where the catalyst weight can correspond to total weight of the catalyst composite. Steam may be concurrently introduced with the feed into the reaction zone. The steam may comprise up to 5 wt % of the feed. In some aspects, the FCC feed residence time in the reaction zone can be less than 5 seconds, or from 3 to 5 seconds, or from 2 to 3 seconds.

In some aspects, the FCC can be operated at low temperature, high conversion conditions. During low temperature operation, the FCC unit can be operated at a temperature from 850° F. (~454° C.) to 950° F. (~510° C.), or 850° F. (~454° C.) to 920° F. (~493° C.), or 850° F. (~454° C.) to 900° F. (~482° C.); hydrocarbon partial pressures from 10 to 50 psia (~70-350 kPa-a), or from 20 to 40 psia (~140-280 kPa-a); and a catalyst to feed (wt/wt) ratio from 3 to 8, or 5 to 6, where the catalyst weight can correspond to total weight of the catalyst composite. Steam may be concurrently introduced with the feed into the reaction zone. The steam may comprise up to 5 wt % of the feed. The residence time for the input feed can be from 2 seconds to 8 seconds, or 4 seconds to 8 seconds, or 4 seconds to 6 seconds.

The catalyst inventory within an FCC reaction system can include a majority of a catalyst suitable for performing the desired cracking reaction and a minor portion of the encapsulated metal catalyst. For example, the encapsulated metal catalyst can correspond to 0.01 wt % to 10.0 wt % of the catalyst inventory.

Cracking catalysts suitable for use within the FCC reactor herein can be fluid cracking catalysts comprising either a large-pore molecular sieve or a mixture of at least one large-pore molecular sieve catalyst and at least one medium-pore molecular sieve catalyst. Large-pore molecular sieves suitable for use herein can be any molecular sieve catalyst having an average pore diameter greater than ~0.7 nm which are typically used to catalytically "crack" hydrocarbon feeds. In various aspects, both the large-pore molecular sieves and the medium-pore molecular sieves used herein be selected from those molecular sieves having a crystalline tetrahedral framework oxide component. For example, the crystalline tetrahedral framework oxide component can be selected from the group consisting of zeolites, tectosilicates, tetrahedral aluminophosphates (AlPOs) and tetrahedral silicoaluminophosphates (SAPOs). Preferably, the crystalline framework oxide component of both the large-pore and medium-pore catalyst can be a zeolite. More generally, a molecular sieve can correspond to a crystalline structure having a framework type recognized by the International Zeolite Association. It should be noted that when the cracking catalyst comprises a mixture of at least one large-pore molecular sieve catalyst and at least one medium-pore molecular sieve, the large-pore component can typically be used to catalyze the breakdown of primary products from the catalytic cracking reaction into clean products such as naphtha and distillates for fuels and olefins for chemical feedstocks.

Large pore molecular sieves that are typically used in commercial FCC process units can be suitable for use herein. FCC units used commercially generally employ conventional cracking catalysts which include large-pore zeolites such as USY or REY. Additional large pore molecular sieves that can be employed in accordance with the present invention include both natural and synthetic large pore zeolites. Non-limiting examples of natural large-pore zeolites include gmelinite, faujasite, cancrinite, offretite, and mordenite. Non-limiting examples of synthetic large pore zeolites are zeolites X, Y, L, beta, omega, REY and USY zeolites. In some aspects, the large pore molecular sieves used herein can be selected from large pore zeolites. In such aspects, suitable large-pore zeolites for use herein can be the faujasites, particularly zeolite Y, USY, and REY.

Medium-pore size molecular sieves that are suitable for use herein include both medium pore zeolites and silicoaluminophosphates (SAPOs). Medium pore zeolites suitable for use in the practice of the present invention are described in "Atlas of Zeolite Structure Types", eds. W. H. Meier and D. H. Olson, Butterworth-Heineman, Third Edition, 1992, and in the International Zeolite Association website (www-.www.iza-online.org), hereby incorporated by reference. The medium-pore size zeolites generally have an average pore diameter less than 0.7 nm, typically from 0.5 to 0.7 nm and includes for example, MFI, MFS, MEL, MTW, EUO, MTT, HEU, FER, and TON structure type zeolites (IUPAC Commission of Zeolite Nomenclature). Non-limiting examples of such medium-pore size zeolites, include ZSM-5, ZSM-12, ZSM-22, ZSM-23, ZSM-34, ZSM-35, ZSM-38, ZSM-48, ZSM-50, silicalite-1, and silicalite2. An example of a suitable medium pore zeolite can be ZSM-5, described (for example) in U.S. Pat. Nos. 3,702,886 and 3,770,614. Other suitable zeolites can include ZSM-11, described in U.S. Pat. No. 3,709,979; ZSM-12 in U.S. Pat. No. 3,832,449; ZSM-21 and ZSM-38 in U.S. Pat. No. 3,948,758; ZSM-23 in U.S. Pat. No. 4,076,842; and ZSM-35 in U.S. Pat. No. 4,016,245. As mentioned above SAPOs, such as SAPO-11, SAPO-41, and, described (for example) in U.S. Pat. No. 4,440,871 can also be used herein. Non-limiting examples of other medium pore molecular sieves that can be used herein include chromosilicates; gallium silicates; iron silicates; aluminum phosphates (AlPO), such as AlPO-11 described in U.S. Pat. No. 4,310,440; titanium aluminosilicates (TASO), such as TASO-45 described in EP-A No. 229,295; boron silicates, described in U.S. Pat. No. 4,254,297; titanium aluminophosphates (TAPO), such as TAPO-11 described in U.S. Pat. No. 4,500,651 and iron aluminosilicates. All of the above patents are incorporated herein by reference.

The medium-pore size zeolites (or other molecular sieves) used herein can include "crystalline admixtures" which are thought to be the result of faults occurring within the crystal or crystalline area during the synthesis of the zeolites. Examples of crystalline admixtures of ZSM-5 and ZSM-11 can be found in U.S. Pat. No. 4,229,424, incorporated herein by reference. The crystalline admixtures are themselves medium-pore size zeolites, in contrast to physical admixtures of zeolites in which distinct crystals of crystallites of different zeolites are physically present in the same catalyst composite or hydrothermal reaction mixtures.

In some aspects, the large-pore zeolite catalysts and/or the medium-pore zeolite catalysts can be present as "self-bound" catalysts, where the catalyst does not include a separate binder. In some aspects, the large-pore and medium-pore catalysts can be present in an inorganic oxide matrix component that binds the catalyst components together so that the catalyst product can be hard enough to survive inter-particle and reactor wall collisions. The inorganic oxide matrix can be made from an inorganic oxide sol or gel which can be dried to "glue" the catalyst components together. Preferably, the inorganic oxide matrix can be comprised of oxides of silicon and aluminum. It can be preferred that separate alumina phases can be incorporated into the inorganic oxide matrix. Species of aluminum oxyhydroxides-γ-alumina, boehmite, diaspore, and transitional aluminas such as α-alumina, β-alumina, γ-alumina, δ-alumina, ε-alumina, κ-alumina, and ρ-alumina can be employed. Preferably, the alumina species can be an aluminum trihydroxide such as gibbsite, bayerite, nordstrandite, or doyelite. Additionally or alternately, the matrix material may contain phosphorous or aluminum phosphate. Optionally, the large-pore catalysts and medium-pore catalysts can be present in the same or different catalyst particles, in the aforesaid inorganic oxide matrix.

In the FCC reactor, the cracked FCC product can be removed from the fluidized catalyst particles. Preferably this can be done with mechanical separation devices, such as an FCC cyclone. The FCC product can be removed from the reactor via an overhead line, cooled and sent to a fractionator tower for separation into various cracked hydrocarbon product streams. These product streams may include, but are not limited to, a light gas stream (generally comprising $C_4$ and lighter hydrocarbon materials), a naphtha (gasoline) stream, a distillate (diesel and/or jet fuel) steam, and other various heavier gas oil product streams. The other heavier stream or streams can include a bottoms stream.

In the FCC reactor, after removing most of the cracked FCC product through mechanical means, the majority of, and preferably substantially all of, the spent catalyst particles can be conducted to a stripping zone within the FCC reactor. The stripping zone can typically contain a dense bed (or "dense phase") of catalyst particles where stripping of volatiles takes place by use of a stripping agent such as steam. There can also be space above the stripping zone with a substantially lower catalyst density which space can be referred to as a "dilute phase". This dilute phase can be thought of as either a dilute phase of the reactor or stripper in that it will typically be at the bottom of the reactor leading to the stripper.

In some aspects, the majority of, and preferably substantially all of, the stripped catalyst particles are subsequently conducted to a regeneration zone wherein the spent catalyst particles are regenerated by burning coke from the spent catalyst particles in the presence of an oxygen containing gas, preferably air thus producing regenerated catalyst particles. This regeneration step restores catalyst activity and simultaneously heats the catalyst to a temperature from 1200° F. to 1400° F. (~649 to 760° C.). The majority of, and preferably substantially all of the hot regenerated catalyst particles can then be recycled to the FCC reaction zone where they contact injected FCC feed.

During regeneration, the oxidation of coke can result in generation of CO and the release of nitrogen-containing ring structures. The inclusion of an encapsulated metal catalyst with the cracking catalyst can allow for oxidation of CO to $CO_2$ while reducing or minimizing the production of NOx. This can allow the regenerator to be operated without requiring a selective catalytic reduction stage for processing of the regenerator flue gas.

Small Pore Zeolite Encapsulated Metal Catalyst

In various aspects, small pore size zeolites having a catalytic metal present in encapsulated form inside the pores and/or cavities of the zeolite can be used for selective CO and/or $C_{3-}$ oxidation within a hydrocarbon-containing reaction environment, such as a hydrocarbon processing system that includes a regenerator for regeneration of catalyst by removal of coke. Without wishing to be bound by theory, it is believed that the encapsulation of the catalytic metal within the small pore size synthetic zeolites, in particular within the pores and/or cavities of small pore size synthetic zeolites, limits the growth of the catalytic metal species to small particles, for example, catalytic metal particles having a biggest dimension of less than 4.0 nm, for instance a biggest dimension in the range between 0.1 and 3.0 nm, such as between 0.5 and 1.0 nm, and prevents significant growth of those particles thereby providing an improved resistance to sintering. The size of the particles of catalytic metal (at least in terms of biggest dimension) is typically larger than the pore window size of the zeolite, and so the metal can be considered to be occluded within the cavities in the zeolite crystals rather than being present in the small pore windows of the zeolite. Conventional noble metal catalysts on silica supports, in contrast, generally exhibit sintering and therefore growth of the metal particles under high temperature cycles of reduction and oxidation which leads to a reduction in the number of catalytic sites and the activity of the catalyst.

Optionally, the small pore size synthetic zeolite is of framework type ABW, AEI, AFX, ANA, ATT, BCT, BIK, BRE, CAS, CDO, CHA, DDR, EAB, EDI, EEI, ERI, ESV, GIS, GOO, IHW, ITE, ITW, JBW, KFI, LEV, LTA, LTJ, LTN, MER, MON, MTF, MWF, NSI, PAU, PHI, PWY, RHO, RTH, SAS, SFW, THO, TSC, UFI, or integrowth materials thereof, more preferably of framework type AEI, AFT, AFX, CHA, CDO, DDR, EDI, ERI, IHW, ITE, ITW, KFI, MER, MTF, MWF, LEV, LTA, PAU, PWY, RHO, SFW or UFI, and more preferably of framework type CHA, AEI, AFX, RHO, KFI or LTA. Optionally, the small pore synthetic zeolite is of framework type CHA or AFX. CHA is an especially preferred framework type. The zeolite framework type may optionally be a framework type which can be synthesized without requiring the presence of a structure directing agent. In an alternative embodiment the small pore size synthetic zeolite may be of a framework type which requires the presence of a structure directing agent in the synthesis mixture.

Optionally the small pore size synthetic zeolite is one in which the framework contains one or more elements selected from the group consisting of Si, Al, P, As, Ti, Ge, Sn, Fe, B, Ga, Be and Zn; preferably in which the framework contains at least one tetravalent element X selected from the group consisting of Si, Ge, Sn and Ti and/or at least one trivalent element Y selected from the group consisting of Al, B, Fe and Ga, optionally one pentavalent element Z selected from the group consisting of P and As, and optionally one divalent element W selected from the group consisting of Be and Zn; more preferably in which the framework contains at least Si and/or Al and optionally P; most preferably in which the framework contains Si and/or Al and optionally P. Where the zeolite framework contains a metal, such as Fe, the catalytic metal and transition metal will be other than the metal contained in the framework. Typically, the catalytic metal is extra-framework metal, that is, the catalytic metal generally does not form part of the framework of the synthetic zeolite, i.e. of the three-dimensional framework of tetrahedra of the synthetic zeolite.

Optionally, the small pore size synthetic zeolite is selected from the group consisting of silicates, aluminosilicates, borosilicates, aluminophosphates (AlPOs), and silicoaluminophosphates (SAPOs); preferably from silicates, aluminosilicates, aluminophosphates (AlPOs), and silicoaluminophosphates (SAPOs); more preferably from silicates and aluminosilicates.

The small pore size synthetic zeolite may optionally be a crystalline aluminophosphate or silicoaluminophosphate. Aluminophosphate molecular sieves are porous frameworks containing alternating aluminum and phosphorous tetrahedral atoms connected by bridging oxygen atoms. In the case of silicoaluminophosphate molecular sieves, some of the phosphorous, or pairs of aluminum and phosphorous atoms can be substituted with tetrahedral silicon atoms. Those materials may be represented by the formula, on an anhydrous basis:

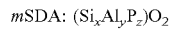

$$mSDA: (Si_xAl_yP_z)O_2$$

m in the number of moles of SDA per mole of $(Si_xAl_yP_z)O_2$ and m has a value in the as-synthesized form from 0.01 to 0.5, preferably from 0.04 to 0.35; x, y, and z respectively represent the mole fraction of Si, Al and P as tetrahedral oxides, where x+y+z=1, and y and z are greater than or equal to 0.25. Preferably, x is greater than 0 in the case of silicoaluminophosphate molecular sieves and optionally, x is in the range of from greater than 0 to 0.31. The range of y is from 0.25 to 0.5, and z is in the range of from 0.25 to 0.5 and preferably y and z are in the range 0.4 to 0.5.

Optionally the small pore size synthetic zeolite contains Si and Al and has a $SiO_2:Al_2O_3$ molar ratio of greater than 6:1, preferably greater than 10:1, preferably greater than 30:1, more preferably greater than 100:1, most preferably greater than 150:1. In some aspects, the $SiO_2:Al_2O_3$ molar ratio can be between 10 to 50, or 12 to 25. While the presence of aluminum within the zeolite framework structure does contribute acidic sites to the catalyst it also is associated with a reduction in thermal stability of the zeolite. Many industrial organic feedstock conversion processes are carried out at temperatures which require the use of zeolite supports having a $SiO_2:Al_2O_3$ molar ratio of greater than 6:1 or even greater than 10:1.

In aspects where the small pore zeolite includes Al, the small pore zeolite can be used in its protonic acidic form, or with ammonia as the extra-framework counter-ion, or with any convenient alkali metal and/or alkaline earth metal as the extra-framework counter-ion, or a combination thereof. Examples of suitable alkali metal and/or alkaline-earth metal counter-ions include, but are not limited to, Na, K, Cs, Ca, and Mg.

The small pore size synthetic zeolite has a degree of crystallinity of at least 80%, optionally at least 90%, preferably at least 95% and most preferably at least 98%. In one embodiment the small pore size synthetic zeolite is essentially pure crystalline material. The degree of crystallinity may be calculated via x-ray diffraction (XRD) by comparison with a reference material of known 100% crystalline material of the same framework type, the same composition, the same or similar particle size and containing the same amount of metals prepared by an incipient wetness technique. The catalytic metal is primarily extra-framework metal and is in the form of metal particles that will tend to scatter x-rays. Therefore in order to obtain fully comparable results to calculate the degree of crystallinity it is important that the reference material contains the same amount of the same metals as present in the small pore size synthetic zeolite.

The small pore size synthetic zeolite comprises at least 0.01 wt % of catalytic metal, based on the weight of the zeolite. The amount of metal is determined by X-ray fluorescence (XRF) or inductively coupled plasma (ICP) and is expressed as wt % of the metal (based on the elemental form of the metal, and not, for example, the oxide form) in the total sample. Optionally, the small pore size synthetic zeolite comprises at least 0.05 wt %, preferably from 0.05 to 10 wt % of the catalytic metal, preferably from 0.05 wt % to 5.0 wt %, more preferably from 0.05 to 3.0 wt %, most preferably from 0.05 to 1.0 wt %.

The weight percentage of the catalytic metal which is encapsulated in the zeolite can be calculated by carrying out an organic conversion reaction involving a mixed feed having at least one feed compound which is small enough to enter the pores of the zeolite and at least one feed compound which is too large to enter the pores of the zeolite or diffusive at any significant rate at the selected reaction temperature, and by comparing the results with an equivalent reaction carried out using a catalyst having an equivalent metal loading in which the metal is not encapsulated, for example one in which the metal is supported on amorphous silica. For example, for a hydrogenation catalyst the weight percentage of the catalytic metal which is encapsulated in the zeolite may be measured by hydrogenation of a mixed feed comprising a feed compound, such as ethylene, which is small enough to enter the pores of the zeolite and a feed compound, such as propylene, which can enter the pores of the zeolite, but is enough larger than ethylene so that diffusion through the zeolite pores at any significant rate is hindered when the reaction temperature is moderate (e.g. 100° C.). For the catalysts of the invention, the conversion of the larger molecule, for example $C_{4+}$ hydrocarbonaceous species, will be slower than the conversion of the smaller molecule, for example ethylene, relative to the reference catalyst and the degree of difference can be used to calculate the percentage of catalytic metal which is encapsulated. It should be recognized that this method only takes into account the catalytic metal present in the zeolite of the invention, i.e. the metal at the external surface of the metal particles that has a catalytic activity. For example, the bulk metal inside any large metal particles present or any catalytic metal covered under dense $SiO_2$ layers will not take part in the reaction and so will not influence the selectivity and the product mix obtained. For that reason, the words "at least 20 wt % of the catalytic metal is encapsulated in the zeolite" and similar expressions should be taken to mean "at least 20 wt % of the catalytically active portion of the catalytic metal is encapsulated in the zeolite", it being understood that in many cases the catalytically active portion of the catalytic metal will be all or substantially all of the catalytic metal.

Optionally, at least 40 wt %, preferably at least 60 wt %, more preferably at least 80 wt %, more preferably at least 90 wt %, more preferably at least 95 wt %, and most preferably at least 98 wt % of the catalytic metal is encapsulated in the zeolite of the present invention. In an especially preferred embodiment, at least 80 wt %, more particularly at least 95 wt % of the catalytic metal is encapsulated in the zeolite of the present invention.

The catalytic metal may be selected from group consisting of Ru, Rh, Pd, Os, Ir, Pt, Ni, Au, Ag and combinations thereof, more preferably from the group consisting of Ru, Rh, Pd, Os, Ir, Pt, Au, Ag, and combinations thereof; most preferably from the group consisting of Pt, Rh, Pd and combinations thereof. Pt and Rh are especially preferred catalytic metals.

Typically, the catalytic metal will be present in the form of metal particles, which includes metal clusters as well as site-isolated single metal atoms (the catalytic metal may be present in the particles and/or clusters as elemental metal or as the metal oxide). Optionally, the catalytic metal is present in the form of particles wherein at least 80% of the particles by number have a biggest dimension of less than 4 nm as measured by transmission electron microscopy (TEM). Preferably at least 80% of the particles by number have a biggest dimension in the range of from 0.1 to 3.0 nm, for instance from 0.5 to 1 nm, as measured by TEM. In the present application, the expression "biggest dimension" when discussing metal particle size means the biggest dimension as measured by TEM. In the case of substantially spherical particles, the biggest dimension of a particle will correspond to its diameter. In the case of rectangular particles, the biggest dimension of a particle will correspond to the diagonal of the rectangle drawn by the particle.

The small pore size synthetic zeolite may further comprise one or more metals other than the catalytic metal. Optionally, the small pore size synthetic zeolite comprises at least 0.01 wt %, optionally from 0.05 to 5.0 wt %, such as from 0.05 to 3.0 wt % of a transition metal selected from the group consisting of Cu, Fe, Ti, Zr, Nb, Hf, Ta and combinations thereof. Preferably, this transition metal is primarily extra-framework metal and at least 20 wt %, preferably at least 40 wt %, more preferably at least 60 wt % and most preferably at least 80 wt % of the transition metal is encapsulated in the zeolite.

In one embodiment the small pore size synthetic zeolite is an aluminosilicate having a $SiO_2$:$Al_2O_3$ molar ratio of greater than 6:1, wherein the catalytic metal is selected from the group consisting of Pt, Rh, Pd and Au, and combinations thereof and wherein the zeolite is of framework type CHA, AEI, AFX, RHO, KFI or LTA.

In one embodiment the small pore size synthetic zeolite is in as-synthesized form and comprises a structure directing agent (SDA), in particular an organic structure directing agent (OSDA), within its pores.

In an alternative embodiment the small pore size synthetic zeolite does not comprise a structure directing agent. For example, the small pore size synthetic zeolite may be in calcined form.

It is possible to produce a small pore size synthetic zeolite in which the catalytic metal is to a large extent encapsulated in the zeolite. For example, a process for the preparation of the small pore synthetic zeolite of the invention comprising: a) providing a reaction mixture comprising a synthesis mixture capable of forming the small pore size synthetic zeolite framework and at least one catalytic metal precursor, wherein the catalytic metal precursor includes metal complexes stabilized by ligands L selected from the group consisting of N-containing ligands, O-containing ligands, S-containing ligands, and P-containing ligands; b) heating said reaction mixture under crystallization conditions to form crystals of said small pore size synthetic zeolite, and c) recovering said crystals of the small pore size synthetic zeolite from the reaction mixture. In such an aspect, it is believed that the ligands L stabilize the metal complex in the synthesis mixture, which is generally highly alkaline, such that it does not become part of the zeolite framework or precipitate from the solution to form large particles which cannot be encapsulated.

In such an aspect, the ligand L may be a O-containing ligand, such as oxalate ion or acetylacetonate ion. Alternatively, the ligand L may be a S-containing ligand, such as a thiol of the structure $HS-(CH_2)_x-Si-(OR)_3$, where x=1 to 5 and R=$C_1$ to $C_4$ alkyl, preferably methyl, ethyl, propyl, or butyl, most preferably x=3 and R=methyl or ethyl, or the S-containing ligand may be an alkyl thiol. Alternatively, the ligand L may be a P-containing ligand, such as phosphine, for example, triphenylphosphine. Preferably, the ligand L is a N-containing ligand, in particular an amine such as $NH_3$, ethylenediamine, diethylenetriamine, triethylenetetramine or tetraethylene pentamine, preferably selected from the group consisting of $NH_3$ and bidentate amines such as ethylene diamine and combinations thereof. The ligand L should be chosen such that the catalytic metal precursor is stable in the highly alkaline conditions of the synthesis mixture, or in a fluoride media. In particular, the catalytic metal precursor should be stable against precipitation at the pH of the synthesis mixture under the conditions used to form the small pore synthetic zeolite. Optionally, the catalytic metal precursor is selected from the group consisting of [Pt(NH$_3$)$_4$]Cl$_2$, [Pt(NH$_3$)$_4$](NO$_3$)$_2$, [Pd(NH$_2$CH$_2$CH$_2$NH$_2$)$_2$]Cl$_2$, [Rh(NH$_2$CH$_2$CH$_2$NH$_2$)$_3$]Cl$_3$, [Ir(NH$_3$)$_5$Cl]Cl$_2$, [Re(NH$_2$CH$_2$CH$_2$NH$_2$)$_2$O$_2$]Cl, [Ag(NH$_2$CH$_2$CH$_2$NH$_2$)]NO$_3$, [Ru(NH$_3$)$_6$]Cl$_3$, [Ir(NH$_3$)$_6$]Cl$_3$, [Ir(NH$_3$)$_6$](NO$_3$)$_3$, [Ir(NH$_3$)$_5$NO$_3$](NO$_3$)$_2$.

Advantageously, the synthesis mixture capable of forming the small pore size synthetic zeolite framework comprises a source of a tetravalent element X and/or a source of a trivalent element Y, and optionally a source of a pentavalent element Z, and the molar ratio of the catalytic metal precursor (in terms of metal): (XO$_2$+Y$_2$O$_3$+Z$_2$O$_5$) in the synthesis mixture is in the range of from 0.00001 to 0.050, preferably from 0.0001 to 0.010, more preferably from 0.001 to 0.008.

In an alternative method, preparation of the small pore size synthetic zeolite can include a) providing a reaction mixture comprising a synthesis mixture capable of forming the small pore size synthetic zeolite framework, at least one anchoring agent, and at least one catalytic metal precursor, wherein the anchoring agent includes at least one amine and/or thiol group and at least one alkoxysilane group and the catalytic metal precursor includes at least one ligand capable of being exchanged by the at least one amine group and/or thiol group of the anchoring agent, b) heating said reaction mixture under crystallization conditions to form crystals of said small pore size synthetic zeolite; and c) recovering said crystals of the small pore size synthetic zeolite from the reaction mixture. In this approach, the inventors believe, without wishing to be bound by theory, that the anchoring agent reacts with the catalytic metal precursor and also with the framework of the zeolite to anchor the catalytic metal precursor in the zeolite as the framework forms.

Optionally, the anchoring agent is a thiol of the structure HS—(CH$_2$)$_x$—Si—(OR)$_3$, where x=1 to 5 and R=C$_1$ to C$_4$ alkyl, preferably methyl, ethyl, propyl, or butyl, most preferably x=3 and R=methyl or ethyl. In an alternative embodiment the anchoring agent is an amine of the structure H$_2$N—(CH$_2$)$_x$—Si—(OR)$_3$, where x=1 to 5 and R=C$_1$ to C$_4$ alkyl, preferably methyl, ethyl, propyl, or butyl, most preferably x=3 and R=methyl or ethyl. Advantageously, the synthesis mixture capable of forming the small pore size synthetic zeolite framework comprises a source of a tetravalent element X and/or a source of a trivalent element Y, and optionally a source of a pentavalent element Z, and the molar ratio of anchoring agent:(XO$_2$+Y$_2$O$_3$+Z$_2$O$_5$) is in the range of from 0.001 to 0.020, preferably in the range of from 0.002 to 0.015.

Optionally, the molar ratio of catalytic metal precursor (in terms of metal):(XO$_2$+Y$_2$O$_3$+Z$_2$O$_5$) is in the range of from 0.00001 to 0.05, preferably from 0.0001 to 0.01, more preferably from 0.0001 to 0.001. The catalytic metal precursor can be any suitable catalytic metal complex which includes at least one ligand capable of being exchanged by the at least one amine group and/or thiol group of the anchoring agent. Optionally, the catalytic metal precursor is selected from the group consisting of H$_2$PtCl$_6$, H$_2$PtBr$_6$, Pt(NH$_3$)$_4$Cl$_2$, Pt(NH$_3$)$_4$(NO$_3$)$_2$, RuCl$_3$.xH$_2$O, RuBr$_3$.xH$_2$O, RhCl$_3$.xH$_2$O, Rh(NO$_3$)$_3$.2H$_2$O, RhBr$_3$.xH$_2$O, PdCl$_2$.xH$_2$O, Pd(NH$_3$)4Cl$_2$, Pd(NH$_3$)$_4$B$_{42}$, Pd(NH$_3$)(NO$_3$)$_2$, AuCl$_3$, HAuBr$_4$.xH$_2$O, HAuCl$_4$, HAu(NO$_3$)$_4$.xH$_2$O, Ag(NO$_3$)$_2$, ReCl$_3$, Re$_2$O$_7$, OsCl$_3$, OsO$_4$, IrBr$_3$.4H$_2$O, IrCl$_2$, IrCl$_4$, IrCl$_3$.xH$_2$O, and IrBr$_4$, where x is from 1 to 18, preferably from 1 to 6.

In an alternative method, preparation of the final metal-containing small pore size synthetic zeolite can include contacting a metal-free small pore zeolite with a metal source, such as a metal salt or metal nanoparticle, followed by calcination in O$_2$ or diluted O$_2$ at elevated temperature (e.g. >400° C.). Without wishing to be bound by any particular theory, in some cases volatile MO$_x$ species with a radius smaller than the pores of a small-pore zeolite can diffuse through the zeolite pores and react with the framework of the zeolite to anchor the catalytic metal species.

In one embodiment the synthesis mixture capable of forming the small pore size synthetic zeolite framework comprises a source of a tetravalent element X and/or a source of a trivalent element Y, optionally a source of a pentavalent element Z, optionally a source of a divalent element W, optionally a source of an alkali metal M, a source of hydroxide ions and/or a source of halide ions, a source of a structure directing agent (SDA) (in particular a source of an organic structure directing agent (OSDA)), and water.

Where X≡Si, suitable sources of silicon (Si) that can be used to prepare the synthesis mixture include silica; colloidal suspensions of silica, for example that sold by E.I. du Pont de Nemours under the tradename Ludox®; precipitated silica; alkali metal silicates such as potassium silicate and sodium silicate; tetraalkyl orthosilicates; and fumed silicas such as Aerosil and Cabosil.

The trivalent element Y is most often one or more of B, Al, Fe, and Ga, preferably B, Al or a mixture of B and Al, most preferably Al.

Suitable sources of trivalent element Y that can be used to prepare the synthesis mixture depend on the element Y that is selected (e.g., boron, aluminum, iron and gallium). In embodiments where Y is boron, sources of boron include boric acid, sodium tetraborate and potassium tetraborate. Sources of boron tend to be more soluble than sources of aluminum in hydroxide-mediated synthesis systems. Optionally, the trivalent element Y is aluminum, and the aluminum source includes aluminum sulfate, aluminum nitrate, aluminum hydroxide, hydrated alumina, such as boehmite, gibbsite, and pseudoboehmite, and mixtures thereof. Other aluminum sources include, but are not limited to, other water-soluble aluminum salts, sodium aluminate, aluminum alkoxides, such as aluminum isopropoxide, or aluminum metal, such as aluminum in the form of chips.

Alternatively or in addition to previously mentioned sources of Si and Al, sources containing both Si and Al elements can also be used as sources of Si and Al. Examples of suitable sources containing both Si and Al elements include amorphous silica-alumina gels, kaolin, metal-kaolin, and zeolites, in particular aluminosilicates such as synthetic faujasite and ultrastable faujasite, for instance USY.

Suitable sources of pentavalent elements Z depend on the element Z that is selected. Preferably, Z is phosphorus. Suitable sources of phosphorus include one or more sources selected from the group consisting of phosphoric acid; organic phosphates, such as triethyl phosphate, tetraethylammonium phosphate; aluminophosphates; and mixtures thereof. Optionally, the synthesis mixture also contains a source of a divalent element W. Optionally, W is selected from the group consisting of Be and Zn.

Optionally, the synthesis mixture also contains a source of halide ions, which may be selected from the group consisting of chloride, bromide, iodide or fluoride, preferably fluoride. The source of halide ions may be any compound capable of releasing halide ions in the molecular sieve synthesis mixture. Non-limiting examples of sources of halide ions include hydrogen fluoride; salts containing one or several halide ions, such as metal halides, preferably where the metal is sodium, potassium, calcium, magnesium, strontium or barium; ammonium fluoride; or tetraalkylammonium fluorides such as tetramethylammonium fluoride or tetraethylammonium fluoride. If the halide ion is fluoride, a convenient source of halide ion is HF or $NH_4F$.

Optionally, the synthesis mixture also contains a source of alkali metal $M^+$. If present, the alkali metal $M^+$ is preferably selected from the group consisting of sodium, potassium and mixtures of sodium and potassium. The sodium source may be a sodium salt such as NaCl, NaBr, or $NaNO_3$; sodium hydroxide or sodium aluminate. The potassium source may be potassium hydroxide or potassium halide such as KCl or NaBr or potassium nitrate.

Optionally, the synthesis mixture also contains a source of hydroxide ions, for example, an alkali metal hydroxide such as sodium hydroxide or potassium hydroxide. Hydroxide can also be present as a counter ion of the (organic) structure directing agent or by the use of sodium aluminate or potassium aluminate as a source of Y, or by the use of sodium silicate or potassium silicate as the source of X. Sodium or potassium aluminate and silicate can also be used as the source of alkali metal $M^+$.

The synthesis mixture optionally further comprises a structure directing agent (SDA), in particular an organic structure directing agent (OSDA). The nature of the SDA (or OSDA) will depend upon the desired framework type. Many such structure directing agents are known to the skilled person. The structure directing agent may be present in any suitable form, for example as a salt of a halide such as a chloride, iodide or bromide, as a hydroxide or as a nitrate. The structure directing agent will generally be cationic and preferably be an organic structure directing agent, for example, a nitrogen-containing cation such as a quaternary ammonium cation. For example, the OSDA may optionally be N,N,N-trimethyl-1-adamantammonium hydroxide or iodide (TMAdA) where it is desired to produce a zeolite of framework type CHA.

The synthesis mixture can have any composition which is suitable for preparing the desired zeolite framework. The following ranges are given as examples of desirable and preferred ranges for each pair of components in the synthesis mixture. Conveniently, the molar ratio of $XO_2$:$Y_2O_3$ in the synthesis mixture may be in the range of from 1 to infinity (i.e. no Y), in particular from 1 to 100, preferably from 4 to 50. Optionally, in the synthesis mixture the molar ratio of SDA:$(XO_2+Y_2O_3+Z_2O_5)$ is in the range of from 0.04 to 1.0, preferably from 0.08 to 0.5. Optionally, in the synthesis mixture the molar ratio of $H_2O$:$(XO_2+Y_2O_3+Z_2O_5)$ is in the range of from 1 to 100, preferably from 10 to 60. Optionally, in the synthesis mixture the molar ratio of $M^+$:$(XO_2+Y_2O_3+Z_2O_5)$ is in the range of from 0 to 0.6, preferably from 0 to 0.20. Optionally, in the synthesis mixture the molar ratio of $OH^-$:$(XO_2+Y_2O_3+Z_2O_5)$ is in the range of from 0 to 1.0, preferably from 0.2 to 0.6. Optionally, in the synthesis mixture the molar ratio of halide$^-$:$(XO_2+Y_2O_3+Z_2O_5)$ is in the range of from 0 to 1, preferably from 0 to 0.5. The reaction mixture may for example have a composition, expressed in terms of mole ratios, as indicated in the following Table:

| Mole ratio | Useful | Preferred |
|---|---|---|
| $XO_2/Y_2O_3$ | 1 to 100 | 4 to 50 |
| SDA/$(XO_2 + Y_2O_3 + Z_2O_5)$ | 0.04 to 1.0 | 0.08 to 0.5 |
| $H_2O/(XO_2 + Y_2O_3 + Z_2O_5)$ | 1 to 100 | 5 to 60 |
| $M^+/(XO_2 + Y_2O_3 + Z_2O_5)$ | 0 to 0.6 | 0 to 0.20 |
| $OH^-/(XO_2 + Y_2O_3 + Z_2O_5)$ | 0 to 1.0 | 0.2 to 0.6 |
| Halide$^-/(XO_2 + Y_2O_3 + Z_2O_5)$ | 0 to 1 | 0 to 0.5 |

The synthesis may be performed with or without added nucleating seeds. If nucleating seeds are added to the synthesis mixture, the seeds are suitably present in an amount from 0.01 ppm by weight to 10,000 ppm by weight, based on the synthesis mixture, such as from 100 ppm by weight to 5,000 ppm by weight of the synthesis mixture. The seeds can for instance be of any suitable zeolite, in particular of a zeolite having the same framework as the zeolite to be obtained.

Crystallization can be carried out under either static or stirred conditions in a suitable reactor vessel, such as for example, polypropylene jars or Teflon® lined or stainless steel autoclaves. The crystallization is typically carried out at a temperature of 100° C. to 200° C., such as 150° C. to 170° C., for a time sufficient for crystallization to occur at the temperature used, e.g., from 1 day to 100 days, in particular from 1 to 50 days, for example from 2 days to 40 days. Thereafter, the synthesized crystals are separated from the mother liquor and recovered.

Since the as-synthesized crystalline zeolite contains the structure directing agent within its pore structure, the product is typically activated before use in such a manner that the organic part of the structure directing agent is at least partially removed from the zeolite. The activation process is typically accomplished by calcining, more particularly by heating the zeolite at a temperature of at least 200° C., preferably at least 300° C., more preferably at least 370° C. for at least 1 minute and generally not longer than 20 hours. While subatmospheric pressure can be employed for the thermal treatment, atmospheric pressure is usually desired for reasons of convenience. The thermal treatment can be performed at a temperature up to 925° C. For instance, the thermal treatment can be conducted at a temperature of from 400 to 600° C., for instance from 500 to 550° C., in the presence of an oxygen-containing gas, for example in air.

Prior to use as a catalyst in an organic compound conversion process should be dehydrated, at least partially. This can be done by heating to a temperature in the range of 100° C. to 500° C., such as 200° C. to 370° C. in an atmosphere such as air, nitrogen, etc., and at atmospheric, subatmospheric or superatmospheric pressures for between 30 minutes and 48 hours. Dehydration can also be performed at room temperature merely by placing the molecular sieve in a vacuum, but a longer time is required to obtain a sufficient amount of dehydration.

Once the zeolite has been synthesized, it can be formulated into a catalyst composition by combination with other materials, such as binders and/or matrix materials that provide additional hardness or catalytic activity to the finished catalyst. These other materials can be inert or catalytically active materials.

In particular, it may be desirable to incorporate the zeolite of the present invention or manufactured by the process of the present invention with another material that is resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Naturally occurring clays which may be used include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or after being subjected to calcination, acid treatment or chemical modification. These binder materials are resistant to the temperatures and other conditions, e.g., mechanical attrition, which occur in various hydrocarbon conversion processes. Thus the zeolites of the present invention or manufactured by the process of the present invention may be used in the form of an extrudate with a binder. They are typically bound by forming a pill, sphere, or extrudate. The extrudate is usually formed by extruding the zeolite, optionally in the presence of a binder, and drying and calcining the resulting extrudate.

Use of a material in conjunction with the zeolite of the present invention or manufactured by the process of the present invention, i.e., combined therewith or present during synthesis of the new crystal, which is active, tends to change the conversion and/or selectivity of the catalyst in certain organic conversion processes. Inactive materials suitably serve as diluents to control the amount of conversion in a given process so that products can be obtained in an economic and orderly manner without employing other means for controlling the rate of reaction. These materials may be incorporated into naturally occurring clays, e.g., bentonite and kaolin, to improve the crush strength of the catalyst under commercial operating conditions.

In addition to the foregoing materials, the zeolite can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

The relative proportions of zeolite and inorganic oxide matrix may vary widely, with the molecular sieve content ranging from 1 to 90 percent by weight and more usually, particularly when the composite is prepared in the form of beads, in the range of 2 to 80 weight percent of the composite.

EXAMPLES

For the small pore zeolites used for the encapsulated metal catalysts in the following examples, the degree of crystallinity was >95%. The absence of any amorphous material was determined by the absence of a broad diffraction peak in the 2-theta range of 18-25° and by the absence of a second amorphous phase in an SEM picture. A suitable XRD method involved a Bruker D4 diffractometer using Cu Kα radiation at 35 kV/45 mA, 0.20° divergence slit, and a Vantec detector. Data was collected from 2 to 50° 2-theta, 0.018° step size, and 0.2 sec/step counting time using Bragg-Brentano geometry.

Example 1: Synthesis of Pt Encapsulated in High Silica CHA Zeolite Using TMSH as Anchoring Agent This example illustrates successful preparation of a sintering-resistant platinum catalyst. The method described below was also used to make the encapsulated Pt catalysts described in the other examples.

800 mg of sodium hydroxide (99 wt %, Sigma-Aldrich) was dissolved in 6.9 g of water. Then, 86 mg of a 10 wt % aqueous solution of chloroplatinic acid ($H_2PtCl_6$, 37.50 wt % Pt basis, Sigma-Aldrich) and 52 mg of (3-mercaptopropyl)trimethoxysilane (TMSH, 95%, Sigma-Aldrich) were added to the above solution, and the mixture was stirred for 30 minutes. Afterwards, 13.04 g of an aqueous solution of N,N,N-trimethyl-1-adamantammonium hydroxide (TMAdA, 16.2 wt %) was added and maintained under stirring during 15 minutes. At that time, 293 mg of aluminum hydroxide (58 wt %, Sigma-Aldrich) was added, and the resultant mixture kept under stirring at 80° C. for 30 minutes. Finally, 7.5 g of colloidal silica (Ludox AS40, 40 wt %, Aldrich) was introduced in the synthesis mixture, and maintained under stirring at 80° C. for 30 minutes. The final gel composition was $SiO_2$:0.033 $Al_2O_3$:0.00033 Pt:0.005 TMSH:0.2 TMAdA:0.4 NaOH:20$H_2O$.

The gel was transferred to an autoclave with a Teflon liner, and heated at 90° C. for 7 days, and later, at 160° C. for 2 days under dynamic conditions. The sample after the hydrothermal crystallization was filtered and washed with abundant distilled water, and finally dried at 100° C.

The solid was characterized by Powder X-ray Diffraction (PXRD), obtaining the characteristic PXRD pattern of the CHA material. Elemental analysis by ICE-AES of the resultant solid indicated a Si/Al of 8.5 ($SiO_2$:$Al_2O_3$ molar ratio of 17:1) and analysis by XRF gave a Pt content of 0.21 wt %.

The Pt-containing CHA was calcined at 550° C. in air in order to remove the organic moieties included inside the microporous material during the crystallization process. The calcined sample was then treated with $H_2$ at 400° C. for 2 hours to initially activate the catalyst. TEM microscopy revealed the formation of very small Pt nanoparticles. The Pt nanoparticles were substantially spherical and have a particle size (biggest dimension, i.e. diameter) in the range of 1 to 3 nm within the high-silica CHA structure.

Example 2: Synthesis of Metal-Free High-Silica CHA Zeolite 800 mg of sodium hydroxide (99 wt %, Sigma-Aldrich) was dissolved in 6.9 g of water. Then, 13.04 g of an aqueous solution of N,N,N-trimethyl-1-adamantammonium hydroxide (TMAdA, 16.2 wt %) was added and maintained under stirring during 15 minutes. At that time, 293 mg of aluminum hydroxide (58 wt %, Sigma-Aldrich) was added, and the resultant mixture kept under stirring at 80° C. for 30 minutes. Finally, 7.5 g of colloidal silica (Ludox AS40, 40 wt %, Aldrich) was introduced in the synthesis mixture, and maintained under stirring at 80° C. for 30 minutes. The final gel composition was $SiO_2$:0.033 $Al_2O_3$:0.2 TMAdA:0.4 NaOH:20$H_2O$.

The gel was transferred to an autoclave with a Teflon liner, and heated at 160° C. for 2 days under dynamic conditions. The sample after the hydrothermal crystallization was filtered and washed with abundant distilled water, and finally dried at 100° C.

The solid was characterized by Powder X-ray Diffraction (PXRD), obtaining the characteristic PXRD pattern of the CHA material. Elemental analysis by ICE-AES of the resultant solid indicated a Si/Al of 8.6 ($SiO_2$:$Al_2O_3$ molar ratio of 17.2:1).

The Pt-containing CHA was calcined at 550° C. in air in order to remove the organic moieties included inside the microporous material during the crystallization process.

Example 3: Synthesis of Pt Encapsulated in High Silica CHA Zeolite by Post-Synthesis Cation Exchange (0.3% wt Pt/CHA)

6 mg of $Pt(NH_3)(NO_3)_2$ was dissolved in 10 ml of distilled water. Then, 1 g of the calcined metal-free high-silica CHA zeolite prepared according to the Example 2 was added to the above aqueous solution under agitation (liquid/solid ratio of 10 wt/wt). The mixture was maintained under stirring at room temperature overnight. After this period, the mixture was filtered and washed with abundant water, and the resultant solids calcined at 650° C. in air for 4 hours. Finally, the resultant metal-containing zeolites was treated with $H_2$ at 400° C. for 2 hours.

Example 4: Synthesis of Pt Encapsulated in High Silica CHA Zeolite by Post-Synthesis Cation Exchange (0.1% wt Pt/CHA)

2 mg of $Pt(NH_3)(NO_3)_2$ was dissolved in 10 ml of distilled water. Then, 1 g of the calcined metal-free high-silica CHA zeolite prepared according to the Example 2 of the preset invention was added to the above aqueous solution under agitation (liquid/solid ratio of 10 wt/wt). The mixture is maintained under stirring at room temperature overnight. After this period, the mixture is filtered and washed with abundant water, and the resultant solids calcined at 650° C. in air for 4 hours. Finally, the resultant metal-containing zeolites are treated with $H_2$ at 400° C. for 2 hours.

Example 5—Oxidation of CO

Figure 3:
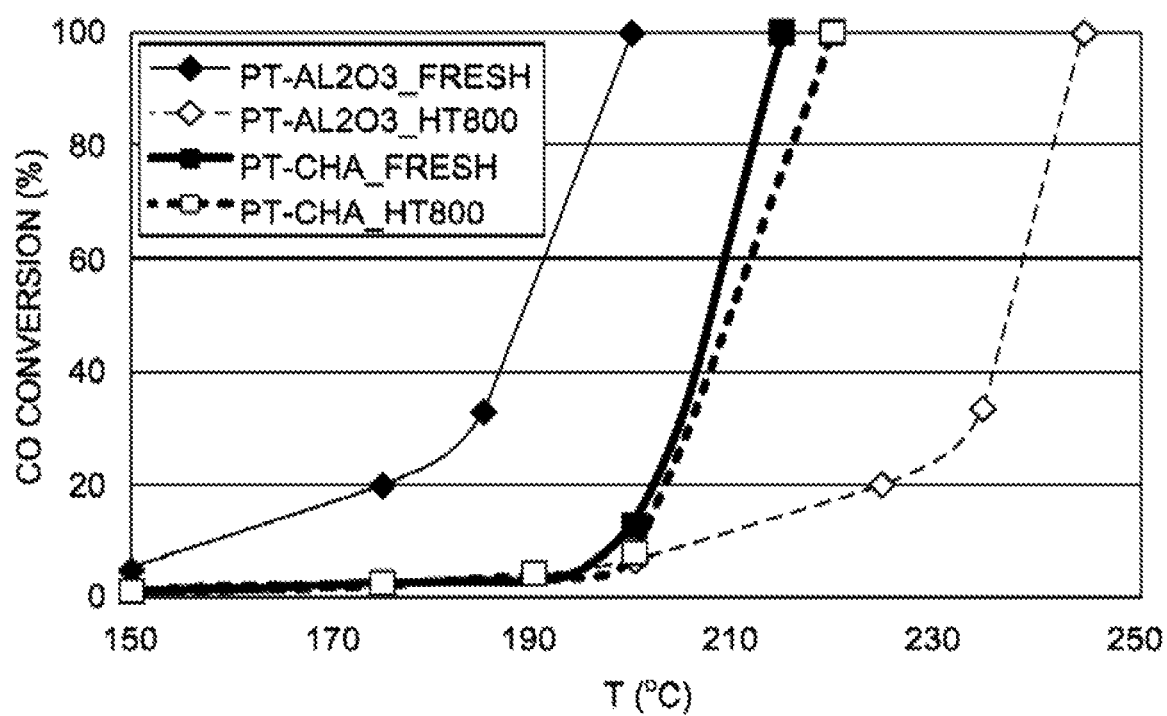
FIG. 3 shows a comparison of CO conversion rates using various catalysts prior to and after exposure to catalyst regeneration conditions.

A Pt/CHA catalyst including 0.3 wt % Pt prepared according to Example 3, was tested in comparison with a conventional Pt/$Al_2O_3$ catalyst for oxidation of CO in the absence of any nitrogen compound. This test provided a confirmation that both materials were active CO oxidation catalysts. FIG. 3 shows the conversion of CO as a function of temperature in the following feed: 95 ml/min, containing 1.8 vol % CO, 11 vol % $O_2$, balance $N_2$. The catalyst amount was 40 mg for the 1 wt % Pt/$Al_2O_3$ and 120 mg for the 0.3 wt % Pt/CHA. Under these conditions, full conversion of CO was reached for the fresh catalysts (after the initial activation with Hz) at ~190-200° C. with the Pt/$Al_2O_3$ catalyst and 200-210° C. with the Pt/CHA catalyst, respectively. The data show that both catalysts were effective to remove CO from the stream when the catalysts were fresh and no nitrogen compound is co-fed. However, the reference Pt/$Al_2O_3$ catalyst exhibited strong deactivation after being subjected to a high temperature $O_2$ treatment (at 800° C.; referred to as HT800 in FIG. 3) prior to the reaction. By contrast, the Pt/CHA system maintained similar activity before and after the $O_2$ treatment. Thus, the Pt/CHA system provided enhanced stability after exposure to both reductive and oxidative conditions, compared to Pt/$Al_2O_3$.

Example 6—Selective Oxidation of CO Relative to Pyridine

Pyridine is an example of a nitrogen-containing compound. It is believed that activity for conversion of the nitrogen in pyridine to nitrogen oxides is representative of activity for production of NOx in a regenerator environment.

It has been discovered that the presence of nitrogen-containing compounds in the regenerator can actually pose several issues when attempting to convert CO to $CO_2$. In addition to the potential for creation of NOx, it appears that the presence of the nitrogen-containing compounds can also depress the activity of conventional oxidation catalysts for performing the desired oxidation of CO.

To investigate the impact of nitrogen-containing compounds on activity for CO oxidation, pyridine was chosen as a representative N-containing molecule released during regeneration runs of FCC catalysts. A feed containing 5 vol % $O_2$, 2 vol % CO, 1 vol % pyridine, balanced with $N_2$ was passed through a mixture of SiC and the catalyst (Pt/$Al_2O_3$ or Pt/CHA) in a fixed-bed reactor. The pyridine was incorporated to the feed using a saturator at 13° C.

Figure 4:
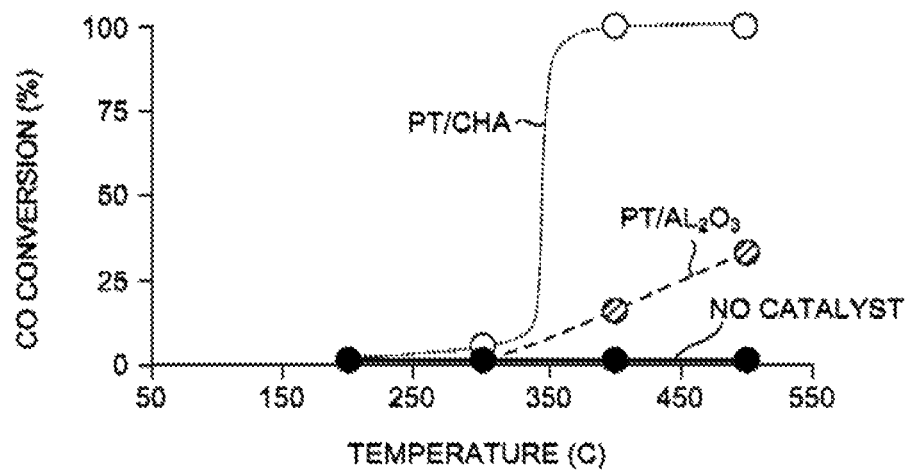
FIG. 4 shows a comparison of CO conversion rates using various catalysts for a feed including both CO and pyridine.
Figure 5:
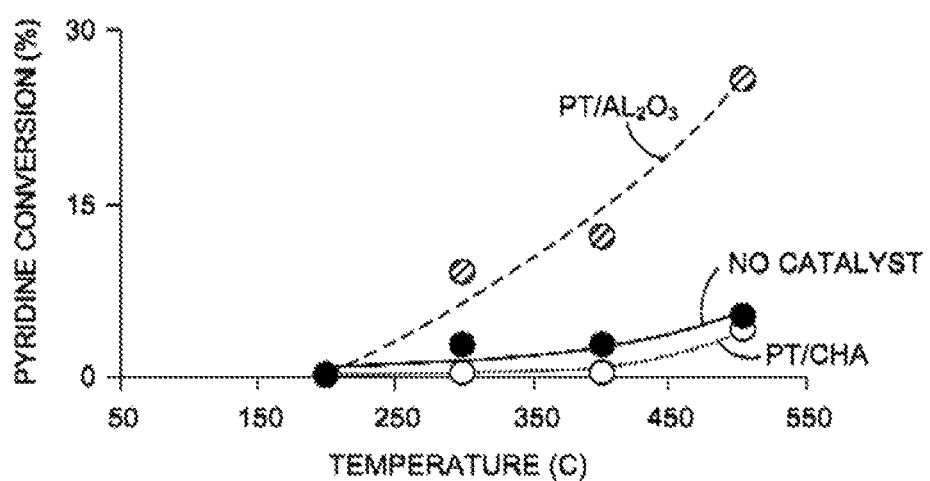
FIG. 5 shows a comparison of pyridine conversion rates using various catalysts for a feed including both CO and pyridine.

FIG. 4 shows results for conversion of CO to $CO_2$ for the Pt/CHA catalyst prepared according to Example 4 in comparison with a conventional (non-encapsulated) Pt/$Al_2O_3$ catalyst and a blank (no catalyst) experiment. In contrast to Pt/CHA, Pt/$Al_2O_3$ is unable to eliminate all the CO from the stream even at a lower WHSV and at a Pt amount that was 10 times greater than the amount of Pt for the Pt/CHA catalyst (i.e., the encapsulated metal catalyst). Additionally, as shown in FIG. 5, the Pt/$Al_2O_3$ catalyst resulted in significant combustion of the pyridine, as noted in the amounts of CO, $CO_2$, $H_2O$ and NOx that were detected as reaction products. By contrast, the loss of pyridine with the Pt/CHA system was comparable to the loss of pyridine in the blank experiment where no Pt-containing catalyst was present. Of course, in the blank experiment, no conversion of CO was accomplished even at 500° C.

Figure 6:
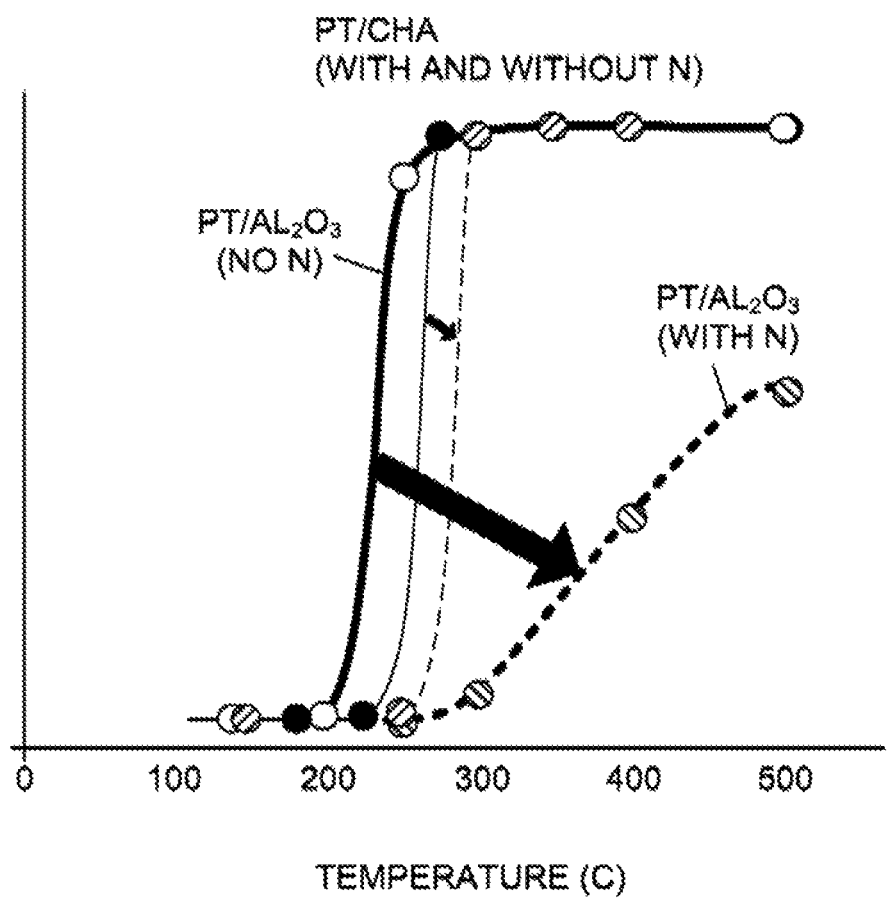
FIG. 6 shows another comparison of CO conversion rates using various catalysts for a feed including both CO and pyridine.

FIG. 6 provides additional data from a second set of experiments where a CO-containing feed, both with and without pyridine in the feed, was exposed to a Pt/CHA catalyst and a Pt/$Al_2O_3$ catalyst. For the results shown in FIG. 6, an identical WHSV was used. The results in FIG. 6 further demonstrate that the performance of the Pt/CHA encapsulated metal catalyst was not affected by the presence of the nitrogen containing compound. This is in sharp contrast to the results for the Pt/$Al_2O_3$ catalyst. Without the presence of pyridine, the Pt/$A_2O_3$ catalyst had somewhat higher activity for CO conversion relative to the Pt/CHA catalyst. However, the Pt/$Al_2O_3$ catalyst required substantially higher temperatures in order to achieve any substantial elimination of CO when the feed stream included pyridine.

Additional Embodiments

Embodiment 1

A method for selective oxidation of CO and $C_{3-}$ hydrocarbonaceous compounds, comprising: exposing a feed comprising a) CO, $C_{3-}$ hydrocarbonaceous compounds, or a combination thereof, and b) at least one additional hydrocarbon, hydrocarbonaceous compound, or combination thereof, to an oxidizing environment in the presence of a small pore zeolite-encapsulated metal catalyst comprising 0.01 wt % to 10 wt % of Ru, Rh, Pd, Os, Ir, Pt, Ni, Au, Ag, or combination thereof as a catalytic metal, to oxidize at least a portion of the CO, $C_{3-}$ hydrocarbons, or a combination thereof, at least 20 wt % of the catalytic metal being encapsulated in the zeolite.

Embodiment 2

The method of Embodiment 1, wherein exposing the feed comprises exposing the feed to a catalyst mixture comprising 0.001 wt % to 10 wt % of the small pore zeolite-encapsulated metal catalyst, relative to a weight of the catalyst mixture.

Embodiment 3

The method of any of the above embodiments, wherein the feed comprises CO, $C_{3-}$ hydrocarbons, or a combination thereof or wherein the feed comprises CO, $C_{2-}$ hydrocarbonaceous compounds, or a combination thereof or wherein the feed comprises CO, $C_{2-}$ hydrocarbons, or a combination thereof.

Embodiment 4

The method of any of the above embodiments, wherein the small pore zeolite-encapsulated metal catalyst comprises a synthetic small pore zeolite; or wherein the small pore size synthetic zeolite comprises an 8-membered ring zeolite of framework type AEI, AFT, AFX, CHA, CDO, DDR, EDI, ERI, IHW, ITE, ITW, KFI, MER, MTF, MWF, LEV, LTA, PAU, PWY, RHO, SFW or UFI; or a combination thereof.

Embodiment 5

The method of Embodiment 4, wherein at least 80 wt % of the catalytic metal is encapsulated in the synthetic small pore zeolite.

Embodiment 6

The method of Embodiment 4 or 5, wherein the small pore size synthetic zeolite comprises an 8-membered ring zeolite of framework type AEI, AFT, AFX, CHA, CDO, DDR, EDI, ERI, IHW, ITE, ITW, KFI, MER, MTF, MWF, LEV, LTA, PAU, PWY, RHO, SFW or UFI.

Embodiment 7

The method of any of Embodiments 4 to 6, wherein small pore size synthetic zeolite comprises a zeolite framework containing one or more elements selected from the group consisting of Si, Al, P, As, Ti, Ge, Sn, Fe, B, Ga, Be and Zn; or wherein the zeolite framework contains at least one tetravalent element X selected from the group consisting of Si, Ge, Sn and Ti, at least one trivalent element Y selected from the group consisting of Al, B, Fe and Ga, and optionally one pentavalent element Z selected from the group consisting of P and As and/or optionally one divalent element W selected from the group consisting of Be and Zn.

Embodiment 8

The method of any of the above embodiments, wherein a) the small pore zeolite-encapsulated metal catalyst comprises a zeolite of framework type CHA, AEI, AFX, RHO, KFI, LTA, or a combination thereof; b) wherein the small pore zeolite-encapsulated metal catalyst comprises a zeolite comprising a $SiO_2:Al_2O_3$ molar ratio of greater than 6:1; or c) a combination of a) and b).

Embodiment 9

The method of any of the above embodiments, i) wherein the catalytic metal is selected from the group consisting of Pt, Rh, Pd and Au, or a combination thereof; ii) wherein the catalytic metal further comprises a Si, Al, P, As, Ti, Ge, Sn, Fe, B, Ga, Be, Zn, or a combination thereof; or iii) a combination of i) and ii).

Embodiment 10

The method of any of the above embodiments, wherein the feed comprises CO.

Embodiment 11

The method of Embodiment 10, wherein the feed further comprises 0.01 vol % to 10 vol % of nitrogen-containing hydrocarbonaceous compounds (or 0.01 vol % to 1.0 vol %, or 0.1 vol % to 10 vol %), and optionally wherein exposing the nitrogen-containing hydrocarbonaceous compounds to the small pore zeolite-encapsulated metal catalyst in the first oxidizing environment results in conversion of 30 mol % or less of nitrogen in the nitrogen-containing hydrocarbonaceous compounds to NOx; or wherein the nitrogen-containing hydrocarbonaceous compounds comprise cyclic nitrogen-containing compounds; or a combination thereof.

Embodiment 12

The method of Embodiment 10 or 11, the method further comprising exposing a feedstock to fluid catalytic cracking conditions in a reactor in the presence of a cracking catalyst and the small pore zeolite-encapsulated metal catalyst to produce one or more cracked products and spent cracking catalyst; and passing a catalyst mixture comprising a portion of the spent cracking catalyst and the small pore zeolite-encapsulated metal catalyst into a regenerator, the regenerator comprising the oxidizing environment, the feed comprising CO and nitrogen-containing hydrcarbonaceous compounds generated in the oxidizing environment.

Embodiment 13

The method of Embodiment 11 or 12, wherein exposing the nitrogen-containing hydrocarbonaceous compounds to the at least a portion of the small pore zeolite-encapsulated metal catalyst in the oxidizing conditions results in conversion of 30 mol % or less of nitrogen in the nitrogen-containing hydrocarbonaceous compounds to NOx.

Embodiment 14

A system for performing fluid catalytic cracking, comprising: a fluid catalytic cracking reactor, the fluid catalytic cracking reactor comprising a riser and a stripper, the stripper comprising a stripper catalyst outlet and a cracked product outlet, the riser comprising a riser catalyst inlet; a regenerator comprising a regenerator catalyst inlet, a regenerator catalyst outlet, an oxidizing gas inlet, and a flue gas outlet, the stripper catalyst outlet being in fluid communication with the regenerator catalyst inlet, the regenerator catalyst outlet being in fluid communication with the riser catalyst inlet, and a catalyst mixture within at least one of the fluid catalytic cracking reactor and the regenerator, the catalyst mixture comprising a cracking catalyst and 0.001 wt % to 1.0 wt % of a small pore zeolite-encapsulated metal catalyst, the small pore zeolite-encapsulated metal catalyst comprising 0.01 wt % to 10 wt % of Ru, Rh, Pd, Os, Ir, Pt, Ni, Ag, Au, or a combination thereof as an encapsulated metal.

Embodiment 15

The system of Embodiment 14, wherein the small pore zeolite-encapsulated metal catalyst comprises a small pore size synthetic zeolite comprising an 8-membered ring zeolite of framework type AEI, AFT, AFX, CHA, CDO, DDR, EDI, ERI, IHW, ITE, ITW, KFI, MER, MTF, MWF, LEV, LTA, PAU, PWY, RHO, SFW or UFI.

All numerical values within the detailed description and the claims herein are modified by "about" or "approximately" the indicated value, and take into account experimental error and variations that would be expected by a person having ordinary skill in the art.

It will be appreciated that various presently unforeseen or unanticipated alternatives, modifications, variations or improvements therein may be subsequently made by those skilled in the art, and are also intended to be encompassed by the following claims.

The disclosures of the foregoing publications are hereby incorporated by reference in their entirety. The appropriate components and aspects of the foregoing publications may also be selected for the present materials and methods in embodiments thereof

The invention claimed is:

1. A method for selective oxidation of CO and $C_{3-}$ hydrocarbonaceous compounds, comprising:
   exposing a feed comprising a) CO, $C_{3-}$ hydrocarbonaceous compounds, or a combination thereof, and b) at least one additional hydrocarbon, hydrocarbonaceous compound, or combination thereof, to an oxidizing environment in the presence of a small pore zeolite-encapsulated metal catalyst comprising 0.01 wt % to 10 wt % of Ru, Rh, Pd, Os, Ir, Pt, Ni, Au, Ag, or combination thereof as a catalytic metal, to oxidize at least a portion of the CO, $C_{3-}$ hydrocarbons, or a combination thereof, at least 20 wt % of the catalytic metal being encapsulated in the zeolite.

2. The method of claim 1, wherein exposing the feed comprises exposing the feed to a catalyst mixture comprising 0.001 wt % to 10 wt % of the small pore zeolite-encapsulated metal catalyst, relative to a weight of the catalyst mixture.

3. The method of claim 1, wherein the $C_{3-}$ hydrocarbonaceous compounds comprise $C_{3-}$ hydrocarbons.

4. The method of claim 1, wherein the feed comprises CO, $C_{2-}$ hydrocarbonaceous compounds, or a combination thereof.

5. The method of claim 1, wherein the feed comprises CO, $C_{2-}$ hydrocarbons, or a combination thereof.

6. The method of claim 1, wherein the small pore zeolite-encapsulated metal catalyst comprises a small pore size synthetic zeolite.

7. The method of claim 6, wherein at least 80 wt % of the catalytic metal is encapsulated in the synthetic small pore zeolite.

8. The method of claim 6, wherein the small pore size synthetic zeolite comprises an 8-membered ring zeolite of framework type AEI, AFT, AFX, CHA, CDO, DDR, EDI, ERI, IHW, ITE, ITW, KFI, MER, MTF, MWF, LEV, LTA, PAU, PWY, RHO, SFW or UFI.

9. The method of claim 6, wherein the small pore size synthetic zeolite comprises a zeolite framework containing one or more elements selected from the group consisting of Si, Al, P, As, Ti, Ge, Sn, Fe, B, Ga, Be and Zn.

10. The method of claim 1, wherein a) the small pore zeolite-encapsulated metal catalyst comprises a zeolite of framework type CHA, AEI, AFX, RHO, KFI, LTA, or a combination thereof; b) wherein the small pore zeolite-encapsulated metal catalyst comprises a zeolite comprising a $SiO_2:Al_2O_3$ molar ratio of greater than 6:1; or c) a combination of a) and b).

11. The method of claim 1, wherein the catalytic metal is selected from the group consisting of Pt, Rh, Pd and Au, or a combination thereof.

12. The method of claim 1, wherein the catalytic metal further comprises a Si, Al, P, As, Ti, Ge, Sn, Fe, B, Ga, Be, Zn, or a combination thereof.

13. The method of claim 1, wherein the feed comprises CO.

14. The method of claim 13, wherein the feed further comprises 0.01 vol % to 10 vol % of nitrogen-containing hydrocarbonaceous compounds (or 0.01 vol % to 1.0 vol %, or 0.1 vol % to 10 vol %).

15. The method of claim 14, wherein exposing the nitrogen-containing hydrocarbonaceous compounds to the small pore zeolite-encapsulated metal catalyst in the first oxidizing environment results in conversion of 30 mol % or less of nitrogen in the nitrogen-containing hydrocarbonaceous compounds to NOx; or wherein the nitrogen-containing hydrocarbonaceous compounds comprise cyclic nitrogen-containing compounds; or a combination thereof.

16. A method for reducing CO concentrations in regenerator flue gas from a fluid catalytic cracking process, comprising:
   exposing a feedstock to fluid catalytic cracking conditions in a reactor in the presence of a cracking catalyst and a small pore zeolite-encapsulated metal catalyst to produce one or more cracked products and spent cracking catalyst, comprising 0.01 wt % to 10 wt % of Ru, Rh, Pd, Os, Ir, Pt, Ni, Au, Ag, or combination thereof as a catalytic metal, at least 20 wt % of the catalytic metal being encapsulated in the zeolite;
   passing a catalyst mixture comprising spent cracking catalyst and at least a portion of the small pore zeolite-encapsulated metal catalyst into a regenerator;
   exposing the catalyst mixture to oxidizing conditions to form a regenerated catalyst mixture comprising regenerated cracking catalyst and the at least a portion of the small pore zeolite-encapsulated metal catalyst, the oxidizing conditions resulting in production of CO;
   oxidizing at least a portion of the CO in the presence of the at least a portion of the small pore zeolite-encapsulated metal catalyst to form $CO_2$; and
   returning at least a portion of the regenerated catalyst mixture to the reactor,
   wherein the catalyst mixture comprises 0.001 wt % to 10 wt % of the small pore zeolite-encapsulated metal catalyst, or a combination thereof.

17. The method of claim 16, wherein the oxidizing conditions further result in production of 0.01 vol % to 10 vol % of nitrogen-containing hydrocarbonaceous compounds.

18. The method of claim 17, wherein exposing the nitrogen-containing hydrocarbonaceous compounds to the at least a portion of the small pore zeolite-encapsulated metal catalyst in the oxidizing conditions results in conversion of 30 mol % or less of nitrogen in the nitrogen-containing hydrocarbonaceous compounds to NOx.

19. The method of claim 17, wherein the nitrogen-containing hydrocarbonaceous compounds comprise cyclic nitrogen-containing hydrocarbonaceous compounds.

20. A system for performing fluid catalytic cracking, comprising:

a fluid catalytic cracking reactor, the fluid catalytic cracking reactor comprising a riser and a stripper, the stripper comprising a stripper catalyst outlet and a cracked product outlet, the riser comprising a riser catalyst inlet; and a regenerator comprising a regenerator catalyst inlet, a regenerator catalyst outlet, an oxidizing gas inlet, and a flue gas outlet, the stripper catalyst outlet being in fluid communication with the regenerator catalyst inlet, the regenerator catalyst outlet being in fluid communication with the riser catalyst inlet, and a catalyst mixture within at least one of the fluid catalytic cracking reactor and the regenerator, the catalyst mixture comprising a cracking catalyst and 0.001 wt % to 1.0 wt % of a small pore zeolite-encapsulated metal catalyst, the small pore zeolite-encapsulated metal catalyst comprising 0.01 wt % to 10 wt % of Ru, Rh, Pd, Os, Ir, Pt, Ni, Ag, Au, or a combination thereof as an encapsulated metal.

21. The system of claim 20, wherein the small pore zeolite-encapsulated metal catalyst comprises a small pore size synthetic zeolite comprising an 8-membered ring zeolite of framework type AEI, AFT, AFX, CHA, CDO, DDR, EDI, ERI, IHW, ITE, ITW, KFI, MER, MTF, MWF, LEV, LTA, PAU, PWY, RHO, SFW or UFI.

* * * * *